United States Patent [19]

Sharples et al.

[11] Patent Number: 4,772,966
[45] Date of Patent: Sep. 20, 1988

[54] SYNCHRONIZATION METHOD AND APPARATUS

[75] Inventors: Thomas D. Sharples, Redwood City; Michael L. Collette, San Francisco; Kelly Quan, San Francisco; George Wong, San Francisco, all of Calif.

[73] Assignee: Otari Electric Co., Ltd., Foster City, Calif.

[21] Appl. No.: 657,948

[22] Filed: Oct. 5, 1984 (Under 37 CFR 1.47)

[51] Int. Cl.$^4$ .................... G11B 15/18; G11B 15/46; G11B 27; G11B 02

[52] U.S. Cl. ........................................ 360/71; 360/13; 360/73

[58] Field of Search .................. 360/13, 14.2, 14.3, 360/71, 72.1, 72.2, 73

[56] References Cited

U.S. PATENT DOCUMENTS 4,351,007  9/1982  Youngquist ........................... 360/13
4,363,049  12/1982  Ohtsuki et al. ...................... 360/13

Primary Examiner—Vincent P. Canney
Attorney, Agent, or Firm—Cushman, Darby & Cushman

[57] ABSTRACT

A synchronizer for synchronizing a slave tape recorder to a master tape recorder. When the speed of the master recorder exceeds 2.5 times the nominal play speed, the synchronizer causes the slave recorder to lag behind the master recorder by an amount related to the speed of the slave recorder. At lower speeds, the synchronizer causes the slave recorder to lock onto the position and speed of the master recorder. The synchronizer employs time-code readers to read time-code on address tracks on the master and slave recorders. The time-code readers produce not only time-code but also clock pulses which are employed to determine the speed of master and slave with high resolution. Both the time-code readers and a resolver employed in the synchronizer are constructed from gate assemblies rather than processors to reduce execution times for the processor in the synchronizer. The resolver is a digital resolver which includes a phase comparator which produces pulses having a width related to the phase difference between indications of the synchronization word in the time-code and polarity to indicate whether the master leads or lags the slave. This signal is applied to a counter which generates a digital error signal based on the phase difference which is employed to control the speed of the slave recorder.

29 Claims, 14 Drawing Sheets

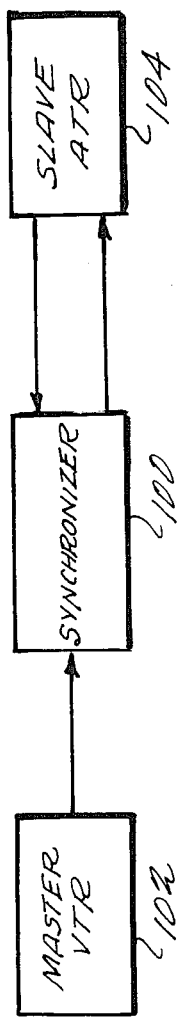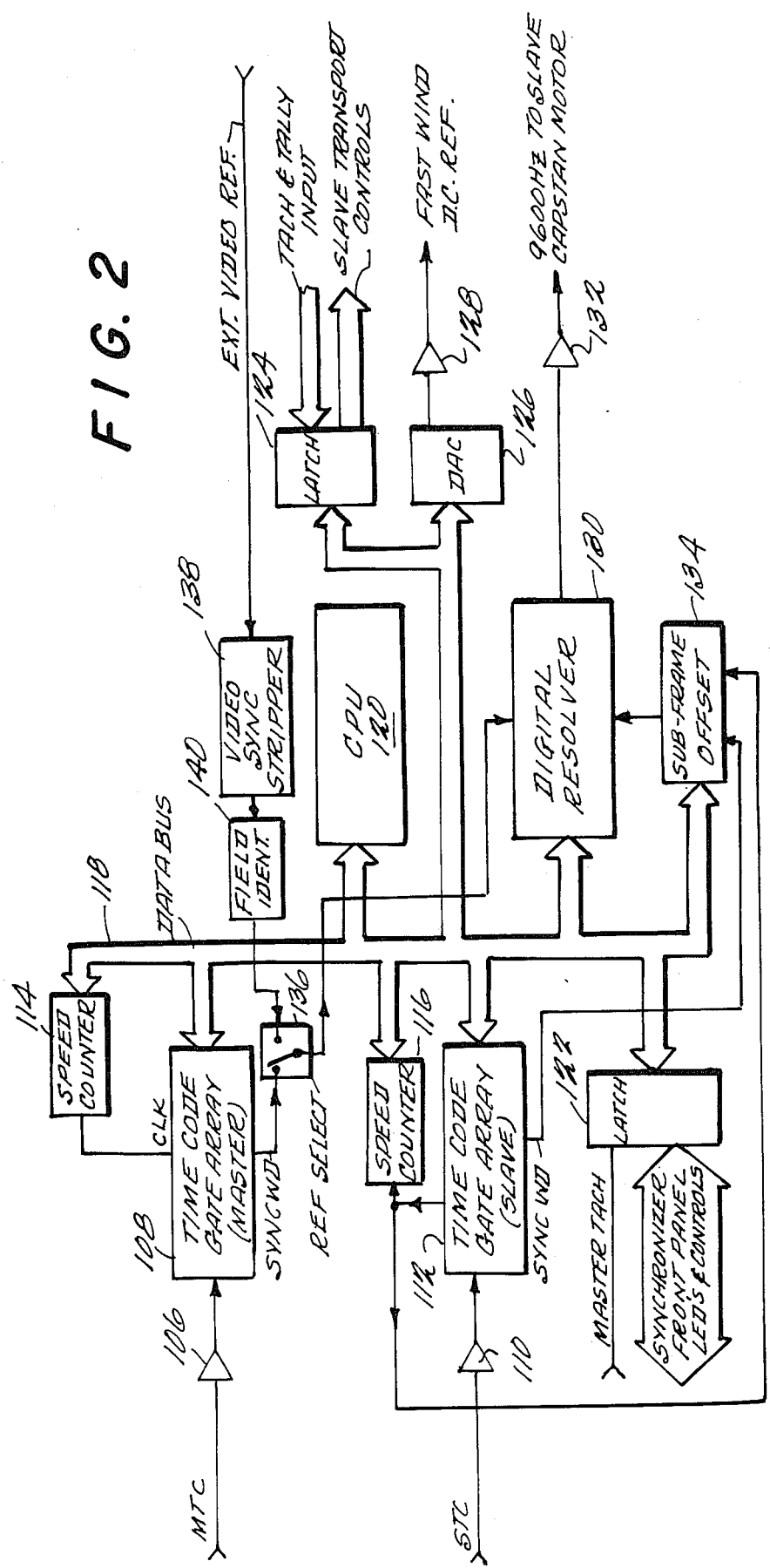

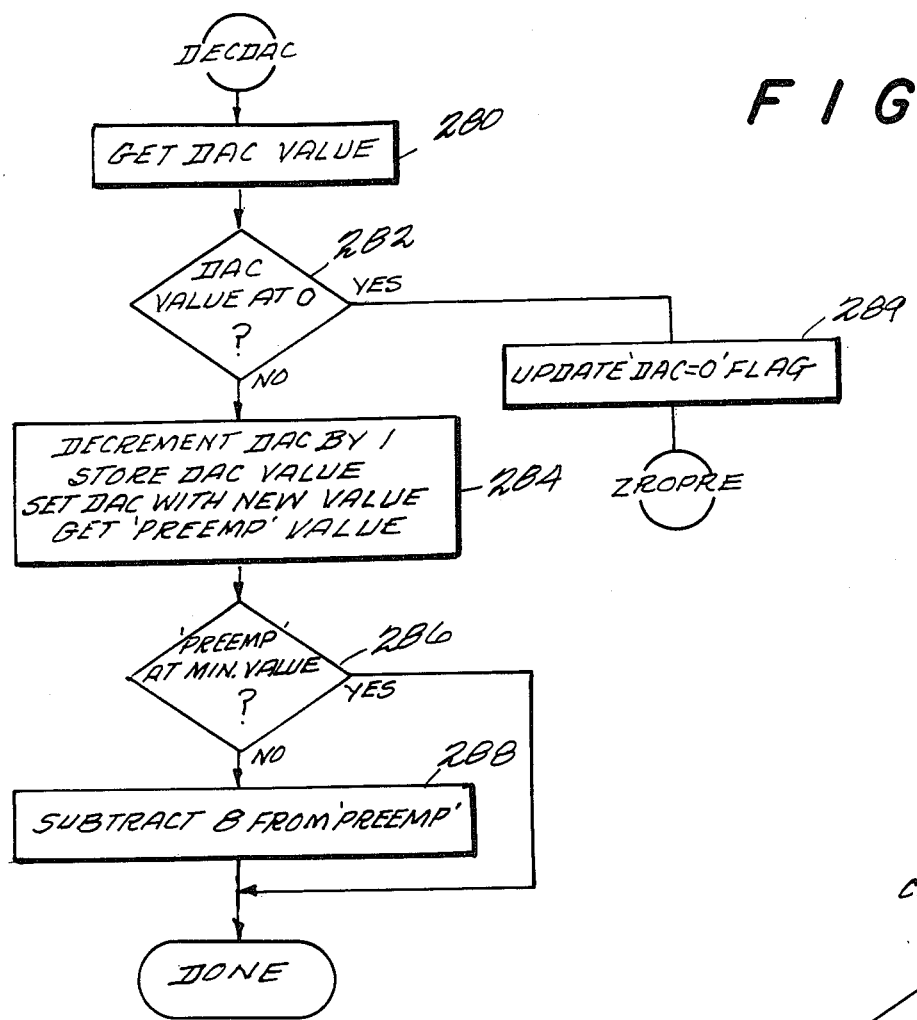
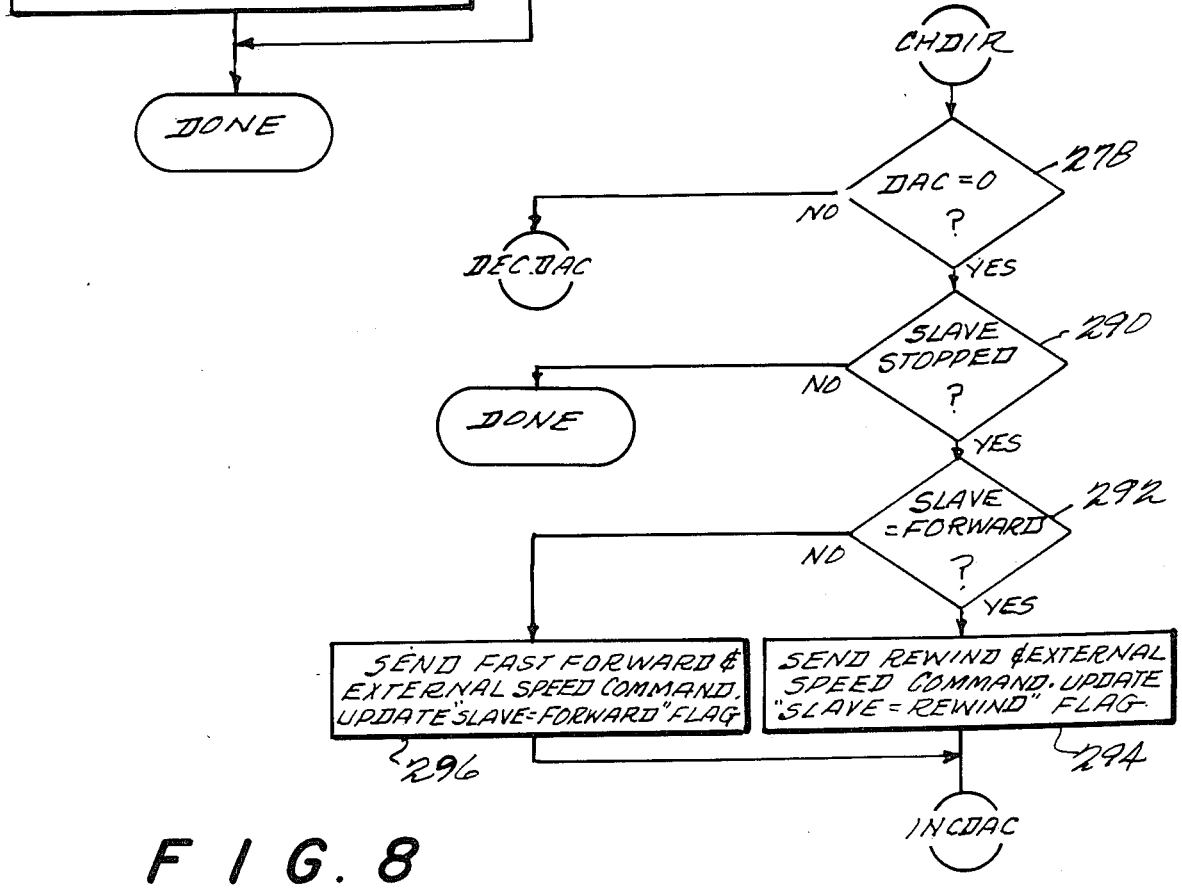
FIG. 9
FIG. 8

SYNCHRONIZATION METHOD AND APPARATUS

This application is related to Collette application Ser. No. 657,946, filed concurrent herewith and entitled "Control Signal Producing Method Apparatus".

BACKGROUND OF THE INVENTION

1. Field of the Invention

The present invention relates to the acquisition of information stored on a medium requiring physical movement to retrieve. More specifically, the present invention relates to the control of driving mechanisms to synchronize the acquisition of data on different media.

2. Description of the Prior Art

In the field of audio post-production for video, as well as music recording for records and film, it is often necessary to create and maintain a very precise positional and speed lock between two or more tape recorders that contain various audio and video information. Often, it is desirable for this information to be recorded and produced in synchronization in a fashion that is more or less automatic with respect to the equipment operator. That is, the operator desires to have a simultaneous presentation of the material recorded on several machines, yet wishes to operate the transport controls of only one.

This kind of operation has traditionally been accomplished via a piece of equipment known as an edit-code chase synchronizer. This device, in its simplest implementation, reads the special address code known as SMPTE time-code, that has been previously recorded on the address tracks of the master and slave tape recorders. The synchronizer then generates for the slave transport rewind, fast-forward, stop, play and capstan speed command signals in such a fashion as to make the slave tape recorder follow the master recorder as closely as possible.

Many difficulties exist in creating a synchronizer which operates optimally. For example, a master tape transport is often capable of being moved to a new location much faster than the slave can catch up due to tape reel inertia in the slave. This is particularly the case when the master must be moved some substantial distance from its previous location, for example, from the end to the beginning of a piece of music or dialogue. When the master is moved to some position that is several minutes away from the position of the slave, prior art chase synchronizers often cannot relocate the slave to the master's new position except by overshooting its destination several times, and even then can locate only to within about several frames of time-code, or about five inches of tape.

In addition, except when the master was in its play mode, prior equipment had limitations with respect to how close the slave could follow the master, particularly when the reels of the master were being slowly rotated by hand after the slave had parked at the master's position. Typically, there existed a positional slave error of at least several seconds of tape, with the slave speed varying erratically above and below the master speed by as much as 200%. Close lock (50 microsecond) was possible only in the forward direction at or near play speed.

These limitations are significant in at least two instances. Many times, an operator turns a video recorder by hand and desires an audio recorder to be aligned. In such a situation, the amount of relative positional error induced by prior art synchronizers makes editing judgments inaccurate. At other times, particularly after fast winding operations, an operator was forced to wait for the slave transport to "settle down" or end its hunting before being able to continue with the editing process.

SUMMARY OF THE INVENTION

The present inventors discovered that typical prior art synchronizers employ a single microprocessor to do almost everything, with the support hardware providing only minimal assistance in the form of digital-to-analog conversion for a capstan control, tachometer pulse rate conversions, tally and command line latching, display driving and interfacing, basic time-code decoding and Manchester code to NRZ code conversion. Furthermore, prior art synchronizers made use of decoded address numbers to locate a transport without also making use of hardware to derive speed information directly from the timecode. It is speculated that this was at least partially responsible for the unpredictability of the slave's lock-up and parking behavior. Also, particularly in fast wind modes, prior art synchronizers attempt to cause the slave to match the position of the master independent of the speeds of the master and slave. This resulted in the overshoot referred to above.

The present invention overcomes these problems by providing a synchronization method and apparatus capable of controlling a slave device so that it stops without overshoot at a position within one frame of the position in which a master device was stopped. Furthermore, the synchronization method and apparatus of the present invention enables precise, one frame, bi-directional positional lock between master and slave devices over any speed from 0.1 to 2.5 times nominal play speed. Furthermore, the synchronization method and apparatus of the present invention allows precise 35 microsecond positional and speed lock between master and slave devices when the master device is moving steadily between 50% and 150% of the nominal play speed.

The method and apparatus of the present invention monitors the position of both the master medium and slave medium and the speed of at least one of the master and slave media. The slave device is then controlled so that the slave medium assumes a position a desired distance behind the master medium position. This desired distance increases as either the master medium speed or the slave medium speed increases to prevent excessive overshoot by the slave medium when the master medium is stopped. In fact, the slave device may be controlled so that the slave medium assumes the precise position of the master medium up to a predetermined speed, and only above this speed is the slave device controlled so that the slave medium lags behind the master medium by the desired distance. In the preferred embodiment, the predetermined speed at which the change occurs is 2½ times the nominal play speed.

To obtain high resolution with respect to the speed determination of both the slave and master media, clock pulses, rather than the time-code itself as used in the prior art, may be generated from the timing data stored on the master and slave media are employed to generate an indication of speed. Once the position and speed of the slave medium closely matches that of the master medium, a resolver may be employed to generate a precise control signal to maintain the 35 microsecond precision speed and positional lock. The resolver may compare the phase between synchronization words within time-codes on the master and slave media and generates a control signal in relation thereto.

In the present invention, both the resolver and the apparatus for converting time-code data into speed and positional data may advantageously be hard-wired gate assemblies. Hard-wired gate assemblies, throughout this specification including the claims, means are assembly of gates whose logical function is controlled by the manner in which the gates are interconnected irrespective of the technology that defines the gates such as integrated circuitry or discrete circuitry. This is to be distinguished from a processor whose logical operations are controlled by a series of instructions which the processor executes. A processing unit may be employed in the synchronizer of the present invention to perform other functions. As a result of the use of gate assemblies to translate time-code and accomplish the resolving function, smoother operation is possible by reducing processor execution time to the absolute minimum.

The resolver in the present invention may be a digital gate assembly. A phase detector produces a signal representative of the phase difference between indications generated in response to synchronizing words of the time-code received from the master and slave media. The level of this signal represents whether the slave or the master medium leads the other. This signal is applied to the up-down input of a counter which also receives clock pulses. The output of the counter is employed to control the slave device. Thus, the output of the counter may be connected to a digital-to-analog converter to produce a voltage level representative of the output of the counter. This voltage level may then be applied to a voltage controlled oscillator which produces a signal whose frequency is related to the output of the counter. This signal may be employed to drive the slave device. The resolver may be preset so that it instantly produces an output signal related to a slave device speed which is approximately the speed desired. Also, the manner in which pulses are applied to the counter may be varied in order to vary the gain of the resolver.

As will be apparent from the following, the preferred embodiments of this invention are synchronizers for controlling tape devices. In fact, in the preferred embodiments discussed below, the master device is a video tape recorder and the slave device is an audio tape recorder. However, it will be clear to those skilled in the art that the present invention has application to any storage device which requires movement of a medium to extract data. Examples include magnetic disks, optical disks and the like.

BRIEF DESCRIPTION OF THE DRAWINGS

These and other objects and advantages of the present invention will become more apparent and more readily appreciated from the following detailed description of the presently preferred exemplary embodiments of the invention taken in conjunction with the accompanying drawings, of which:

FIG. 1 is a block diagram illustrating an environment in which the present invention may be employed;

FIG. 2 is a block diagram of one embodiment of the present invention;

FIGS. 4 through 16 are flow charts illustrating the operation of the processing unit of the present invention.

Figure 3:
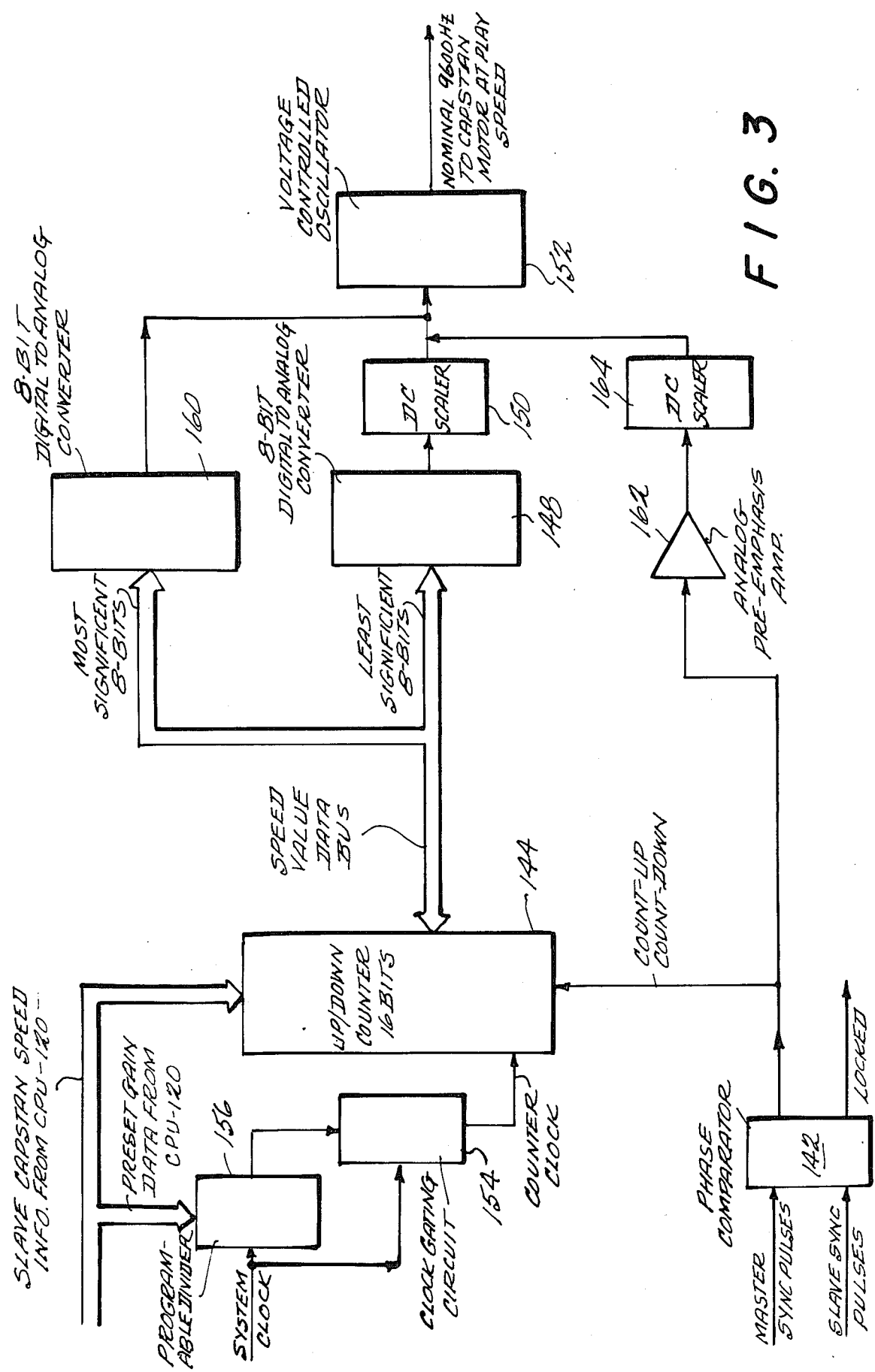
FIG. 3 is a block diagram of the resolver portion of the preferred embodiment of the present invention.

DETAILED DESCRIPTION OF THE PRESENTLY PREFERRED EXEMPLARY EMBODIMENTS OF THE PRESENT INVENTION

FIG. 1 illustrates synchronizer 100 interfacing between master device 102 and slave device 104. In the preferred embodiment, master device 102 is a video tape recorder and slave device 104 is an audio tape recorder. Master recorder 102 may be, for example, Model BVU-800 three-quarter inch U-matic video recorder manufactured by Sony. Slave recorder 104 may be, for example, Model MTR-90 24-track audio tape recorder manufactured by Otari Corporation. Master recorder 102 and slave recorder 104 each send a number of signals to synchronizer 100. These signals include timing data read from the tapes being played on recorders 102 and 104 and can include the output from tachometers on recorders 102 and 104. Synchronizer 100 also sends a number of signals to slave recorder 104. These signals include commands for causing slave recorder 104 to operate in its various modes and commands concerning operating speeds.

As illustrated in FIG. 2, timing data from the master and slave are applied to gate assemblies such as time-code gate array 108 through buffer 106 and time-code gate array 112 through buffer 110, respectively. To relieve burdens on a processing unit in the synchronizer, readers 108 and 112 are gate assemblies in accordance with the meaning set forth above. Cost and performance factors necessitated the development of an LSI time-code reader with self-contained dual-ported RAM that can be asynchronously accessed by a system CPU. Time-code gate arrays 108 or 112 are wide range, operating from between 0.01 and 100 times nominal play speed. These time-code gate arrays are readily commercially available as model I0055 time-code reader gate array manufactured by Otari Corporation.

Typically, video tape recorders record 30 frames of video data per second. In accordance with the industry standard, a special address code, known as SMPTE time-code, is recorded on address tracks for each frame. The recording is accomplished by means of Manchester coding. For each frame, the time-code consists of 80 bits. Sixteen of these bits constitute a synchronization word of twelve "1" bits, preceded by two "0" bits and followed by a "0" bit and then a "1" bit. Thus, by studying the synchronization word, the direction of the tape may be determined. The remaining 64 bits provide a unique time-code identification of each frame by indicating the hours, minutes, seconds and frames which have occurred since a reference position. Similar coding is also applied to address tracks of an audio tape recorder even though the data stored thereon will not be associated in frames.

Time-code gate arrays 108 and 112 produce a great deal of information. Thus, readers 108 and 112 extract the clock signal inherent in Manchester coding and apply the clock signal to a clock output terminal. Also, time-code readers 108 and 112 produce an output indication upon receipt of the synchronization word. Also, a signal is output indicating the direction of travel of the tape as indicated by the synchronization word. Of course, time-code readers 108 and 112 also output data concerning the hours, minutes, seconds and frames for each time-code received. This data is provided in an 8-bit parallel format.

The inherent clock signal decoded from the timing data is applied from time-code readers 108 and 112 to counters 114 and 116, respectively. These counters are read and then reset periodically so that they provide an indication of the speed of tape on master recorder 102 and slave recorder 104. Data from time-code readers 108 and 112 and speed counters 114 and 116 are transferred over data bus 118 to central processing unit 120. CPU 120 is a microprocessor system including necessary associated memory. Processor 120 can also receive output signals from the tachometer on the master recorder 102 through latch 122 and status information concerning slave recorder 104 through latch 124.

With all of this information, processor 120 produces signals for controlling slave recorder 104. Thus, signals from processor 120 are applied through data bus 118 to latch 124 and digital-to-analog converter 126. The output of latch 124 provides control signals to slave recorder 104 to command the various operating states of recorder 104. Digital-to-analog converter 126 provides a voltage through driver 128 which controls the speed of slave recorder 104 in the fast-forward and rewind modes. Those skilled in the art would appreciate that instead of employing a DC reference voltage to control speed during fast wind operations, the same result could be achieved by rapidly switching between fast-forward and rewind modes with a duty cycle of the switching signal being related to the speed of operation.

The advantage of employing a DC control voltage rather than switching between rewind-and-fast-forward commands is that when controlled by the DC voltage, slave recorder 104 is characterized by relatively constant transfer function between input voltage and tape motion regardless of the amount of tape on each reel. When employing a control technique in which command signals are switched between fast-forward and rewind operations, the transfer function of slave recorder 104 would probably not be linear, and would tend to be dependent upon the amount of tape on each reel. Accurate low-speed crawl performance would therefore be somewhat harder to accomplish.

The indication that the sync word of the timing data has been received is applied from time-code readers 108 and 112 to digital resolver 130. The output signal from digital resolver 130 is an AC signal having a frequency which varies around 9,600 Hz. This signal is applied through driver 132 to the capstan motor of slave recorder 104. The particular frequency of the signal from resolver 130 controls the speed of the capstan. The purpose of resolver 130 is to control the speed of slave recorder 104 so that the sync word indication applied to resolver 130 from slave recorder 104 occurs simultaneously with the sync word indication received from master recorder 102.

Resolver 130 is also a gate assembly as defined above which utilizes byte-wide input/output ports to allow microprocessor 120 to control preset speed and gain, as well as to allow microprocessor 120 to query resolver status with respect to lock.

Sub-frame offset 134 provides a means for allowing slave recorder 104 to be controlled to a position offset from master recorder 102 by a predetermined amount less than a frame. Thus, sub-frame offset 134 is an 80-bit programmable delay for the sync word indication received from slave time-code reader 112, implemented by a Z80 counter-timer chip. CPU 120 commands sub-frame offset 134 to count a particular number of clock pulses from slave time-code reader 112 after subframe offset 134 receives the sync word indication from time-code reader 112 before sub-frame offset 134 applies a pulse simulating the sync word signal to resolver 130.

To accomplish variable-speed play synchronization, resolver 130 is designed to operate over a range of ±50% of nominal play speed with a 35 microsecond nominal lock accuracy. CPU 120 disables resolver 130 when it detects that master recorder 102 is operating outside the range of resolver 130, in either a slow crawl or the fast wind modes. As indicated above, when master recorder 102 is operating outside of the range of resolver 130, CPU 102 controls slave recorder 104 by means of a signal from digital-to-analog converter 126 which provides a wider range of control but with less resolution than resolver 130.

The use of counters 114 and 116 allows high-resolution determination of tape speed directly from hardware in a fashion that is asynchronous with respect to incoming time-code data, and because of the large number of samples (2,400 per second), is highly insensitive to data dropouts. Of course, those skilled in the art would readily appreciate that speed information could also be derived in software by calculating the number of frames that have passed in a given time interval, but this has the disadvantages of low resolution and high processor execution time.

Instead of operating from the sync word indication from master time-code reader 108, resolver 130 may also compare external video reference signals with the sync word indication from slave time-code reader 112. Thus, external video reference signals, in the form of black video signals are applied to video sync stripper 138 which eliminates the video data leaving only the synchronization data. Field identifier 140 identifies whether the field is odd or even. Reference selector 136 causes either indications of sync words from time-code reader 108 or sync pulses from field identifier 140 to be applied to resolver 130. This feature of the present invention is advantageous in that it is sometimes desirable to control master recorder 102 with respect to the external video reference signal.

FIG. 3 illustrates a block diagram of resolver 130 in accordance with the preferred embodiment of the present invention. Indications of synchronization words from the timing data read by readers 108 and 112 are applied to phase comparator 142 which produces a signal whose width is related to the phase difference between the sync word indications and whose polarity is related to whether the master or the slave indication was received first. Also, phase comparator 142 produces a signal to indicate when pulses from the master and slave are received essentially simultaneously indicating that the slave is locked to the master.

The output of phase comparator 142 is applied to the up/down input of counter 144. Counter 144 counts clock pulses during the period of the pulse produced by phase comparator 142 in a direction related to the polarity of the output of phase comparator 142. The output of counter 144 provides an indication of the desired speed of slave recorder 104 so that sync word indications from slave recorder 104 are produced at the same time as sync word indications from master recorder 102. Thus, the output of counter 144 is applied to digital-to-analog converter 148 which produces a voltage level related to the output of counter 144. After level adjustment by DC scaler 150, the DC level is applied to voltage controlled oscillator 152. Voltage controlled oscillator 152 produces an AC signal whose frequency is related to the count of counter 144. The frequency of this signal varies around a nominal frequency of 9,600 Hz and is employed to control the capstan motor of slave recorder 104.

To understand the problems of controlling slave recorder 104 with the output of voltage controlled oscillator 152, it is useful to regard the synchronizer/transport system as a number of nested servo systems. System response lag time is dependent upon the low-pass frequency and transfer characteristics of each stage. The greatest problem is encountered in the transfer function of induced low-pass knee is typically at a very low frequency, and that its complex hi-Q internal parallel servo functions can give rise to severe low frequency ringing when the system is subjected to fast rise time control input signals. This effect can be severe enough to result in motor drive amplifier power supply clipping, with resultant tape spill. Similar problems can be encountered when sinusoidal control voltages are applied whose frequency happens to be the same as the critical frequency of the mechanical components. To solve this problem, the rate of change of capstan speed can be reduced. This could be accomplished by reducing the frequency of the clock pulses. However, this would produce less than optimum system response.

To overcome this problem, in the preferred embodiment, counter 144 receives short bursts of higher frequency clock pulses which counter 144 employs to produce a high-resolution digital error signal. The present inventors have determined that it is advantageous to pick a burst length based on the equipment employed which is long enough to produce only one speed overshoot of the capstan for fastest servo lock-up, but not so long as to induce reel servo system instability. The gain of resolver 130 is determined by the length of these bursts, which can be dynamically changed in accordance with the amount of desired correction.

To accomplish this result, system clock pulses are applied to programmable divider 156. CPU 120 provides a signal to divider 156 to control the number of clock pulses divider 156 receives before its output changes state. The output of divider 156 controls clock gating circuit 154. In response to the signal from divider 156, gating circuit 154 allows system clock pulses to be applied to counter 144.

When CPU 120 switches to control by resolver 130, CPU 120 has data concerning the speed of slave recorder 104. It is important that this speed be maintained despite the change of control. Accordingly, when resolver 130 is about to initiate control, CPU 120 sends a speed signal to counter 144. This speed signal is converted to an analog voltage by converter 160 and is employed to operate voltage controlled oscillator 152 so that oscillator 152 produces a signal which will cause the capstan of slave recorder 104 to turn at a rate to maintain the same tape speed.

In fact, even during normal operation, the eight most significant bits from counter 144 are applied to converter 160 and the eight least significant bits from counter 144 are applied to converter 148. Voltage controlled oscillator 152 is operated in accordance with the sum of voltages related to these two different portions of the output signal from counter 144.

The output of phase comparator 142 is also applied to voltage controlled oscillator 152 through analog pre-emphasis amplifier 162 and DC scaler 164. This direct application of the pulse related to the phase difference between sync pulses increases the response time of resolver 130.

The operation of synchronizer 100, as controlled by CPU 120 will now be described with respect to FIGS. 4 through 16. The main program executed by CPU 120 is very short and simple, and therefore is not illustrated. The main loop simply checks the lock flag which indicates whether slave recorder 104 is locked to master recorder 102 and causes the lock LED to match the flag. It then updates the terminal display from flags left by interrupt routines.

Hardware interrupts occur every 10 milliseconds. Interrupt service routines read time-codes from both reader 108 and reader 112 every 10 milliseconds. Two interrupt routines exist, referred to as the odd 20 millisecond interrupt and the even 20 millisecond interrupt which are performed alternately every 10 milliseconds. Two different interrupts are employed simply to control the frequency with which certain sub-routines to be discussed below are executed.

Figure 4:
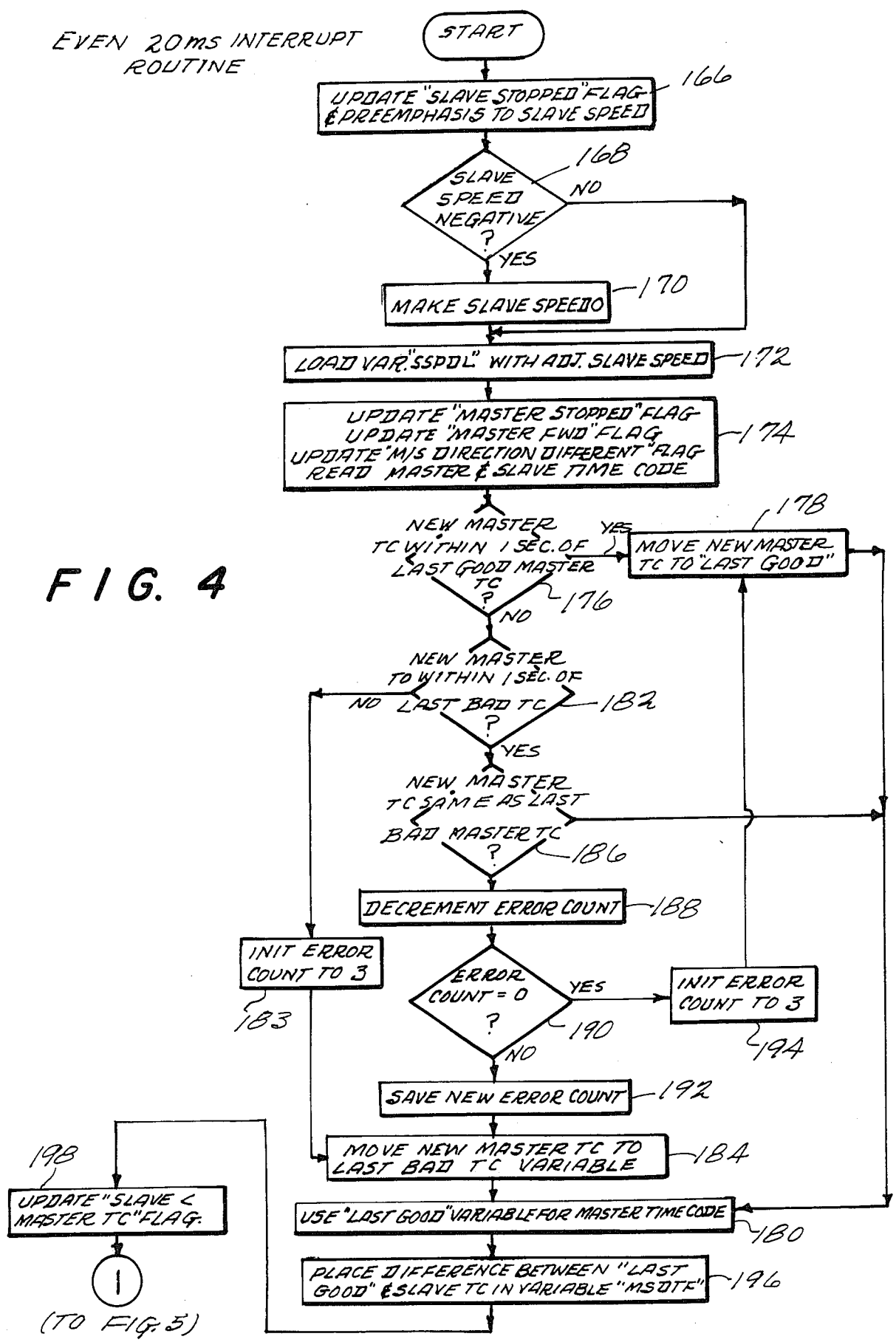

The even 20 millisecond interrupt routine begins in FIG. 4. After starting, step 166 causes the slave stopped flag to be updated. That is, CPU 120 determines whether recorder 104 is stopped and sets the slave stop flag accordingly by examining slave speed counter 116. Also, pre-emphasis is added to the slave speed as determined by counter 116. As will be explained in more detail below, pre-emphasis is a technique for reflecting the relatively slow response of slave recorder 104 as compared to the rate at which the interrupt is performed. During periods of acceleration and deceleration, the speed of slave recorder 104 is made to appear faster and slower, respectively, to CPU 120. The pre-emphasis effect is phased out as slave recorder 104 approaches the desired speed.

At step 168, CPU 120 determines whether the speed of slave recorder 104, as modified by step 166, is negative. If it is not, the adjusted speed value is employed. If step 168 determines that the speed of the slave is negative, at step 170, CPU 120 sets the slave speed to zero. At step 172, the adjusted slave speed is stored in the variable SSPDL which represents a snapshot of the slave speed as adjusted.

Next, a number of flags must be updated. Thus, at step 174, CPU 120 monitors the condition of the master and updates the master stop flag and master forward flag. Furthermore, it determines whether or not both the master and slave are moving in the same direction and updates the master/slave direction different flag. The time-codes for both the master and slave are also read in step 174.

Once the time-code has been read, the master time-code is checked to see whether it is accurate. The inventors have determined that a rather high rate of erroneous code may be obtained from longitudinal tape, particularly at slow crawl, fast wind and high rates of change of speeds. Significantly degraded performance results if these errors are allowed to pass so that erroneous time-codes are employed to control the slave. Steps 176 through 196 check for erroneous code.

The approach employed makes the assumption, based on statistical and experimental analysis, that random time-code decoding errors are quite likely to produce a numerical error of greater than one second. The approach also takes advantage of the redundant nature of time-code by making the further assumption that if any three consecutive decoded time-code words are different but within one second of each other, a correct sequence is being received. This allows a distinction between errors and a tape splice to be made within a constrained length of three frames. When errors are detected, the last valid stored code value is repeated. Since time-code readers 108 and 112 are being polled at a 10 millisecond rate, this routine does not introduce any apparent performance deterioration, in that a single repeated word, which is most likely to occur at very slow crawl speeds, and multiple errors, which are likely to occur at fast wind speeds, will be replaced with new valid numbers more quickly than the system can respond to the anomalies. This approach does not introduce any perceptible response delays between master and slave.

At step 176, CPU 120 determines whether the newly-read master time-code is within one second of a time-code stored in a register called "last good", in which the last master time-code determined to be good is stored. If the determination is positive, it means the new master time-code is assumed to be correct. Accordingly, at step 178, the new master time-code is stored in "last good". At step 180, the time-code stored in "last good" is used as the master time-code.

If the new master time-code is not within one second of the time-code stored in "last good" in step 176, at step 182 it is determined whether the new master time-code is within one second of the time-code stored in a register called "last bad", in which the last time-code read which was not within one second of the last good time-code read is stored. With any first time-code which is not within one second of the last good time-code, the determination at step 182 will probably be negative. Accordingly, at step 183, a register called "error" is initialized to three. At step 184, the newly-read master time-code is moved to the "last bad" register.

Suppose the time-code just determined as being bad is bad because of a splice occurring. When the next time-code is read, step 176 will determine that the most recently read time-code is outside of one second of the time-code stored in "last good". However, at step 182, it will be determined that the new time-code is within one second of the time-code stored in "last bad". At step 186, it is determined whether the new time-code is the same as that stored in "last bad". If so, it is assumed that the same error is being read again so processing proceeds to step 180. If the new time-code is not the same as the time-code stored in "last bad", step 188 causes the count stored in "error" to decrease by one and at step 190, it is determined whether "error" is zero. Steps 188 and 190 cause three consecutive "bad" time-codes to be considered. If each of these time-codes is within a second of the previous, then it is assumed that these are, in fact, good time-codes. Thus, if step 190 determines that three time-codes have not yet been considered, at step 192, the new count in "error" is saved and at step 184, the newly-read master time-code is transferred to the "last bad" register.

However, if step 190 determines that "error" has been decremented to zero, it means that three "bad" error codes have been detected, but each has been within a second of the previous one. Accordingly, at step 194, "error" is initialized to three and at step 178, the newly-read time-code is moved to "last good" so that the newly-read time-code will be considered a good one despite the fact that it is not within a second of the time-code previously stored in the last good register.

After step 180 in which whatever time-code is in the "last good" register will be used for the master time-code, CPU 120 executes steps 196 in which the difference between the time-code stored in "last good" and the slave time-code is stored in a register called "MSDIF". At step 198, a flag which indicates whether the slave or the master is at a more advanced position is updated in response to step 196.

Figure 5:
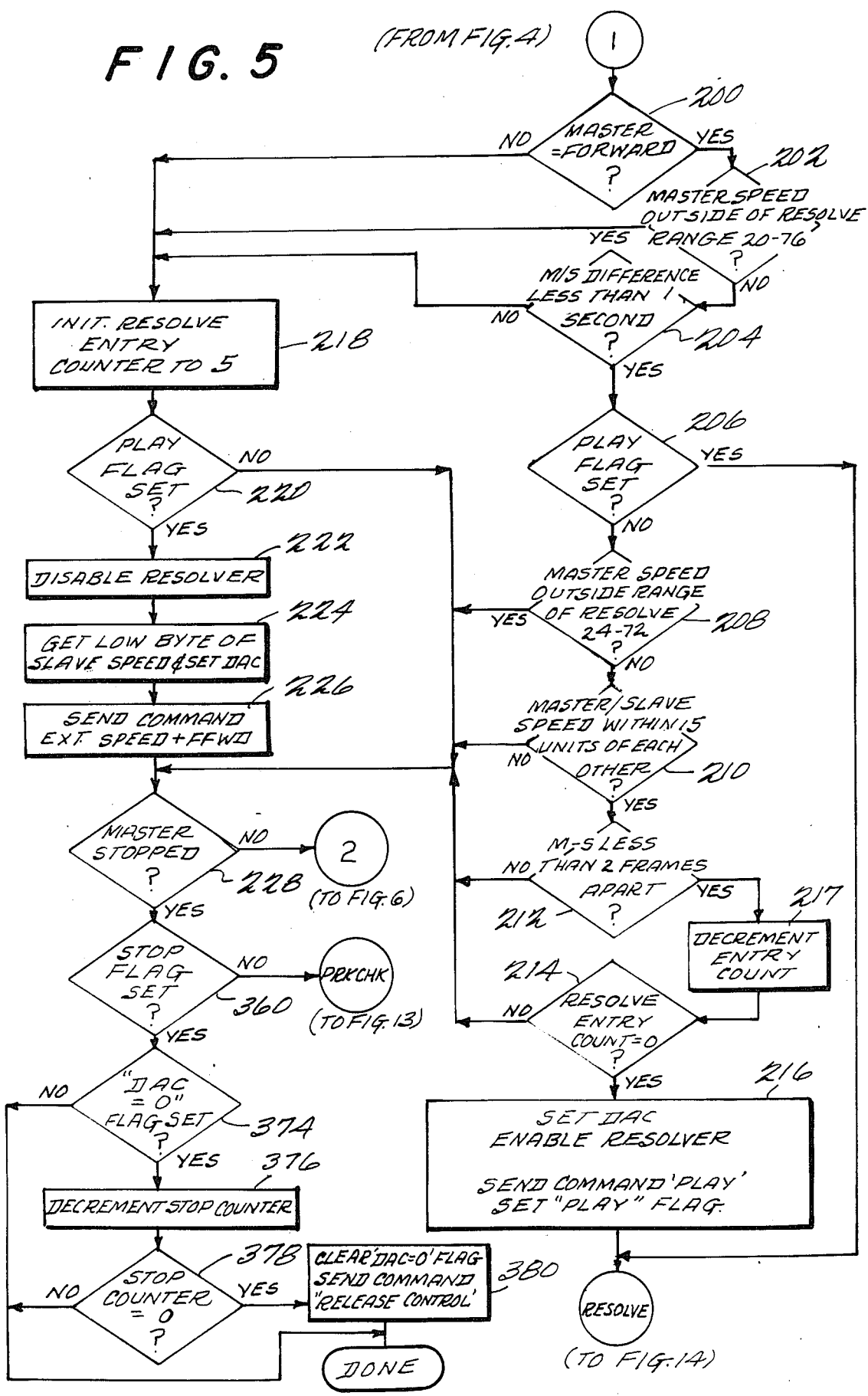

As illustrated in FIG. 5, CPU 120 next determines at step 200 whether master recorder 102 is moving forward. If it is, step 202 determines whether the speed of master record 102 is outside of a resolve range of 20 to 76. These numbers are relative speed numbers related to the value stored in master speed counter 114 (see FIG. 2). If the master speed is *not* outside the resolve range, it is determined at step 204 whether the difference in position between the master and slave is less than one second. If it is, it is next determined whether a flag entitled "play" has been set at step 206. As will be developed below, the play flag is set only when the speed of the master is within the range capable of being handled by resolver 130, the speed of the slave is within 15 units of the speed of the master, and the positions of the slave and master are separated by less than two frames. Under these conditions, the play flag is set, indicating that slave recorder 104 will be controlled by the AC signal which controls the capstan motor, as opposed to the DC signal which controls the reel motors, and resolver 130 is enabled.

If, at step 206, it is determined that the play flag has already been set, then processing proceeds to the RESOLVE sub-routine in which CPU 120 monitors the operation of the synchronizer when the speed of slave recorder 104 is being controlled by the signal applied to the capstan motor. If the play flag has not been set, CPU 120 determines whether it should be set. Thus, if it is determined at step 208 that the master speed is not outside of the resolver range of 24 to 72 speed units, step 210 determines that the master and slave speeds are within 15 units of each other, step 212 determines that the master and slave positions are less than two frames apart, step 214 determines that the resolve entry count is zero then at step 216, digital-to-analog converter 160 (see FIG. 3) in resolver 130 is set to the present speed of slave recorder 104, a play command is sent to slave recorder 104 so that it is controlled by the signal applied to capstan motor, the play flag is set and resolver 130 is enabled. The resolve entry count referred to in step 214 provides time to be certain that the operation of slave recorder 104 has become stabilized. At this point in the program, since step 217 decrements the entry count, the resolve entry count cannot be zero until it is determined in steps 208-212 that for five consecutive passes control by the AC signal to the capstan motor is appropriate.

If any of steps 200, 202 or 204 determine that it would be not appropriate for resolver 130 to control slave recorder 104 by the AC signal, the resolve entry counter is initialized to five in step 218. Step 220 then determines whether the play flag has been set. If it has been set, it means that slave recorder 104 is under resolver control, but such control must end. Accordingly, at step 222, resolver 130 is disabled. At step 224, the speed of slave recorder 104 is applied to digital-to-analog converter 126 (FIG. 2). At step 226, command shifts so that the speed is controlled by the DC signal from digital-to-analog converter 126 rather than the signal applied to the capstan motor.

If the play flag has not been set as determined by step 220 or any of steps 208, 210, 212 or 214 determine that it is not yet appropriate to operate by means of the signal applied to the capstan motor, CPU 120 executes step 228 to determine whether master recorder 102 has stopped. If master recorder 102 has stopped, all that is left to do is to stop slave recorder 104 so that its tape is at a position corresponding to the tape of master recorder 102.

If step 228 determines that master recorder 102 is not stopped, then either master recorder 102 has just started or is continuing to operate and the relationship between slave recorder 104 and master 102 is such that control by resolver 130 is inappropriate. At step 230 (FIG. 6), it is determined whether the stop flag has been set. The stop flag is set only when the slave has been stopped at a position close to the master. Thus, if step 228 determines that the master is not stopped but step 230 determines that the stop flag is set, then it means that the master has just started. When the slave stops, control by synchronizer 100 over slave recorder 104 ends. Once the master starts, it is necessary to regain command over the slave and then move the slave so that it matches the master position. To accomplish this, step 232 determines whether the slave is stopped. At this stage of the flow chart, the slave will not be stopped only if it is being turned by hand. If it is being turned by hand or has had a control button pushed manually, then it is inappropriate for the synchronizer to take control of the slave. Accordingly, a negative determination at step 232 ends the interrupt routine.

However, if it is determined by the slave is stopped, step 234 determines whether the "DAC=0" flag is set. Just as command over slave recorder 104 is released after slave recorder 104 has stopped, the DAC=0 flag is cleared. Accordingly, when the master has just started and the slave is still stopped, the DAC=0 flag is not set. Therefore, at step 236, digital-to-analog converter 126 (see FIG. 2) controlling the fast wind operation of slave 104 is set to zero, the "DAC=0" flag is set, and a stop command is sent from synchronizer 100 to slave recorder 104. This re-establishes control by synchronizer 100 over slave recorder 104.

In the next pass through this routine, presumably it is determined at step 228 (FIG. 5) that the master is no longer stopped but at step 230 (FIG. 6) it is determined that the stop flag is still set. However, this time at step 234, it is determined that the "DAC=0" flag has been set (see step 236). Therefore, at step 238, it is determined whether the master is going forward or backward. If the master is going forward, synchronizer 100 sends a fast-forward command to slave recorder 104 at step 240. At the same time, the stop flag is cleared. If step 238 determines that the master is going in reverse, step 242 causes a rewind command to be sent to slave recorder 104 and the stop flag is reset. Note that although fast-forward and rewind commands may be sent, step 236 set speed control digital-to-analog converter 126 to zero so that slave recorder 104 still does not move.

At this point, it is necessary to get slave recorder 104 moving under control of the wide range voltage produced by digital-to-analog converter 126. If slave recorder 104 is already moving, but not under control of resolver 130, step 230 produces a negative indication.

Therefore, whether it is necessary to start slave recorder 104 moving or whether slave recorder 104 has been moving under control of the voltage from digital-to-analog converter 126, processing passes to step 244. At this point, the manner in which slave recorder 104 is controlled depends upon the state of master recorder 102 and the relationship between master recorder 102 and slave recorder 104. If master recorder 102 is moving at a speed greater than 2.5 times its nominal play speed or if the master and slave are separated in position by more than one second, then the CHASE sub-routine is employed to control slave recorder 104 to a position lagging behind the position of master recorder 102 by an extent related to the speed of slave recorder 104. Otherwise, slave recorder 104 is controlled by the DC voltage from digital-to-analog converter 126 so that its speed and position match that of master recorder 102.

Thus, step 244 determines whether the speed of master recorder 102 is less than 2.5 times nominal play speed. If it is not, at step 246, the slave speed is placed in a register called "SPDDIF" which will be employed in the CHASE sub-routine to determine the appropriate amount by which slave recorder 104 should lag behind as to master recorder 102.

If the speed of master record 102 is less than 2.5 times nominal play speed as determined by step 244, step 248 determines whether the master and slave are going in the same direction. If they are going in the same direction, step 250 determines the difference between the slave and master speeds and loads the difference into the register "SPDDIF". Step 252 determines whether the master is faster than the slave. If so, the sign of register "SPDDIF" is changed to a negative at step 254.

If step 248 determines that the master and slave are going in opposite directions, step 256 adds the slave and master speeds, resulting in an indication of the true speed at which either the slave or master is moving away from the other.

Figure 7:
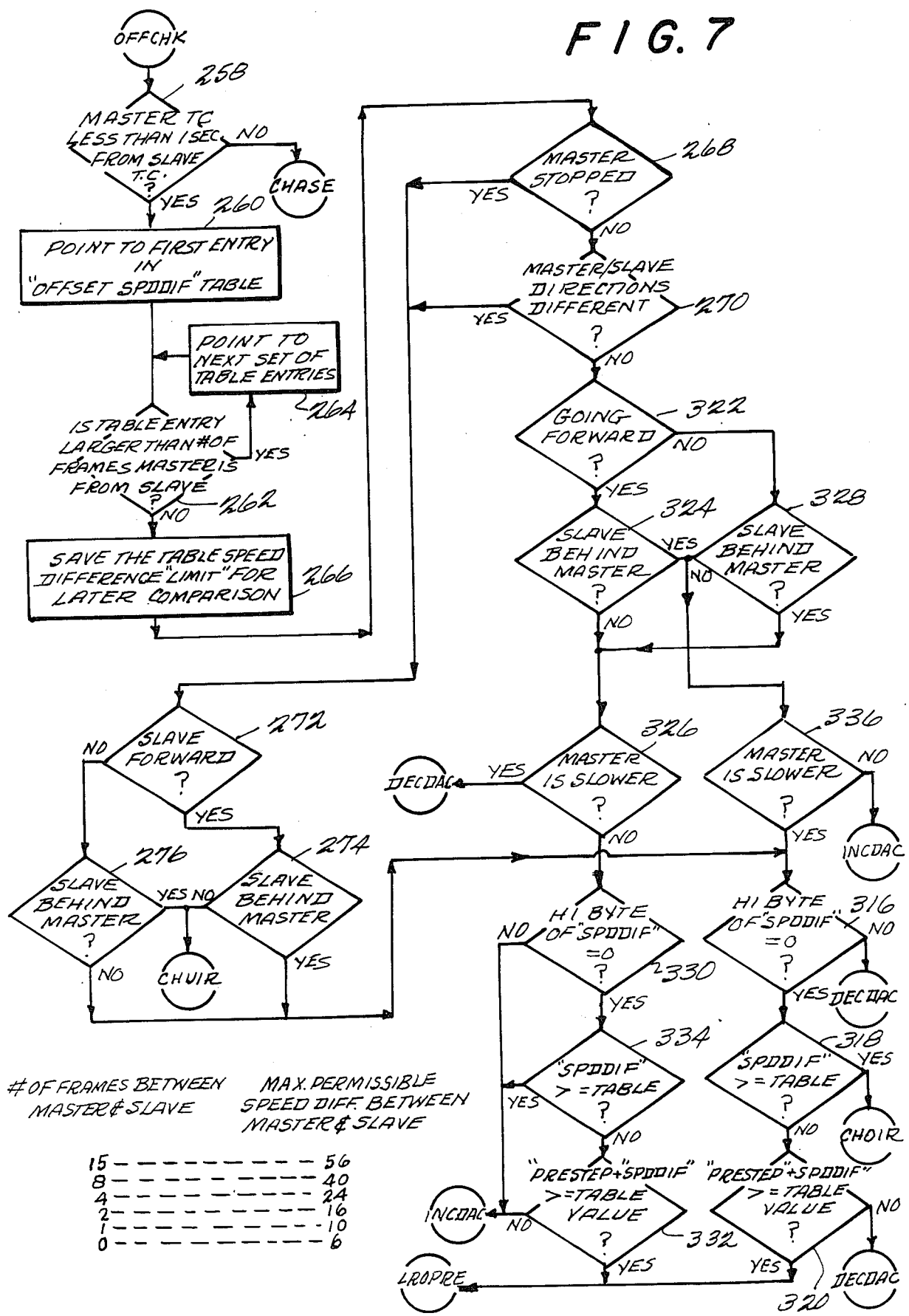

After step 254 or step 256, the OFFCHK sub-routine is entered as illustrated in FIG. 7. At step 258, CPU 120 determines whether the time-code of master 102 is within a second of the time-code from slave 104. As indicated above, if this determination is negative, the CHASE sub-routine is entered. If the determination is positive, step 260 causes the first entry of the OFFSET SPDDIF table to be pointed to. This table, also illustrated in FIG. 7, relates the number of frames separating the position of master 102 and slave 104 to the maximum permissible speed difference between master 102 and slave 104. Steps 262 and 264 then determine the proper entry of the table given the particular distance between master 102 and slave 104. Thus, step 262 determines whether the table entry being pointed to is larger than the number of frames separating master 102 and slave 104. If it is, step 264 causes the next entry of the table to be pointed to and step 262 is repeated. Eventually, the table entry will not be larger than the number of frames separating master 102 and slave 104. At that point, step 266 is executed so that the maximum permissible speed from the table related to the particular distance difference entry is retained.

At step 268, it is determined whether master 102 has stopped. If it has, then it is necessary to bring slave 104 to a smooth stop at the same position. This aspect of the algorithm will be discussed later. Assuming the master has not stopped as determined by step 268, step 270 determines whether master 102 and slave 104 are moving in the same direction. If they are moving in different directions, step 272 determines whether slave 104 is moving forward. If step 270 determines that the slave and master are moving in different directions, step 272 determines that the slave is moving forward but step 274 determines that the slave is ahead of the master, then it is necessary for slave 104 to change directions. If step 270 determines that the slave and master are moving in opposite directions, step 272 determines that the slave is moving in reverse but step 276 determines that the slave is behind the master, then, also, the direction of slave 104 must be reversed.

The reversing of direction of slave 104 is controlled by a sub-routine called "CHDIR" illustrated in FIG. 8. Initially, step 278 determines whether digital-to-analog converter 126 (see FIG. 2) that produces the voltage which controls the reel motors of slave 104 is zero. Before a command in one direction can be changed to a command in the other direction, slave recorder 104 must be stopped and no speed command voltage must be applied to it.

If step 278 determines that the output of digital-to-analog converter 126 is not zero, the DECDAC sub-routine illustrated in FIG. 9 is executed to reduce this value to zero.

Thus, in FIG. 9, this output value is initially retrieved in step 280. If step 282 determines that this value is not zero, step 284 decrements this value by one and stores the value. Then digital-to-analog converter 126 is set with the new value. Finally, the value of pre-emphasis is obtained. Recall that the pre-emphasis variable causes CPU 120 to believe that slave recorder 104 has responded more quickly than it has. Thus, if CPU 120 is controlling slave recorder 104 to a slower value, the pre-emphasis is initially decreased; if CPU 120 is controlling slave recorder 104 to a faster speed, pre-emphasis is initially increased.

At step 286, it is determined whether pre-emphasis is at its minimum value. If it is, it remains and the interrupt routine ends. If it is not, then at 288, the value pre-emphasis is decreased by 8 and the interrupt routine ends.

Returning now to FIG. 8, it will eventually be determined that digital-to-analog converter 126 (see FIG. 2) has been decremented to zero by the DECDAC sub-routine. Accordingly, CPU 120 next determines whether slave recorder 104 has stopped at step 290. If it has not stopped, then it is coasting since digital-to-analog converter 126 is not producing a voltage to drive slave recorder 104. Since slave recorder 104 must stop before further action may be taken, the interrupt routine ends and each routine thereafter also ends until step 290 determines that slave recorder 104 has stopped.

Once step 290 determines that slave recorder 104 has stopped, it is possible to reverse the direction command to slave recorder 104. Thus, CPU 120 determines at step 292 whether slave recorder 104 is commanded to move in the forward direction. If it is, step 294 causes a rewind command to be sent to slave 104. Also, an external speed command is sent which causes slave recorder 104 to operate under control of the voltage from digital-to-analog converter 126. Finally, a flag is set to indicate that the slave has been commanded to enter the rewind mode. If step 292 determines that slave recorder 104 has previously been commanded to move in reverse, step 296 causes a fast-forward command to be sent to slave 104. Also, an external speed command is sent and a flag in CPU 120 is updated to indicate that slave 204 has been commanded to move forward.

After step 294 or step 296, slave 104 may begin to move in its new direction so that it matches the position and speed of master 102. The increasing in speed of slave 104 is accomplished by increasing the voltage produced by a digital-to-analog converter 126. This accomplished in the sub-routine referred to as "INCDAC" illustrated in FIG. 10.

Figure 10:
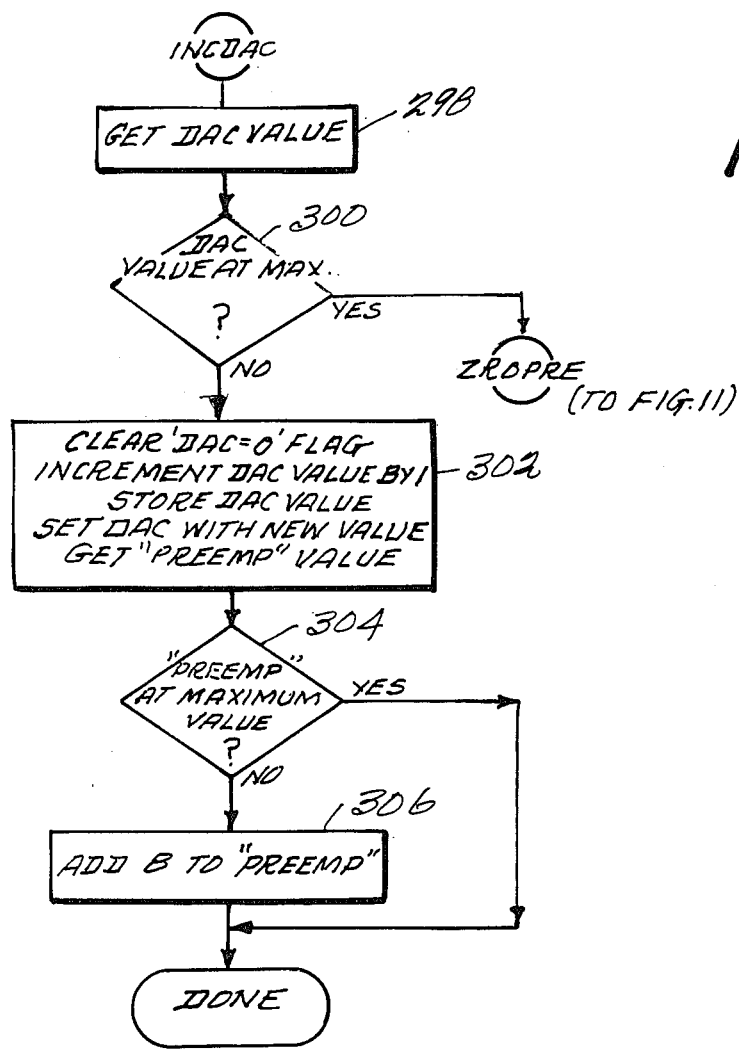

In FIG. 10, the value which CPU 120 is applying to digital-to-analog converter 126 is retrieved in step 298. At step 300, it is determined whether this value is at a maximum. If it is not, step 302 causes the "DAC=0" flag to be cleared. The value applied to digital-to-analog converter 126 is incremented by one and stored. Digital-to-analog converter 126 is then set with the new value. Finally, the pre-emphasis value is obtained. As indicated below, when CPU 120 is causing slave recorder 104 to accelerate, the monitored speed of slave recorder 104 is artificially increased to cause CPU 120 to believe that slave recorder 104 is responding more quickly than it actually can. Accordingly, at step 304, it is determined whether the pre-emphasis value is at a maximum. If it is not, step 306 increments the pre-emphasis value by 8. If step 304 determines that the pre-emphasis value is already at a maximum, it is not further increased. With this, the interrupt sub-routine ends.

Figure 11:
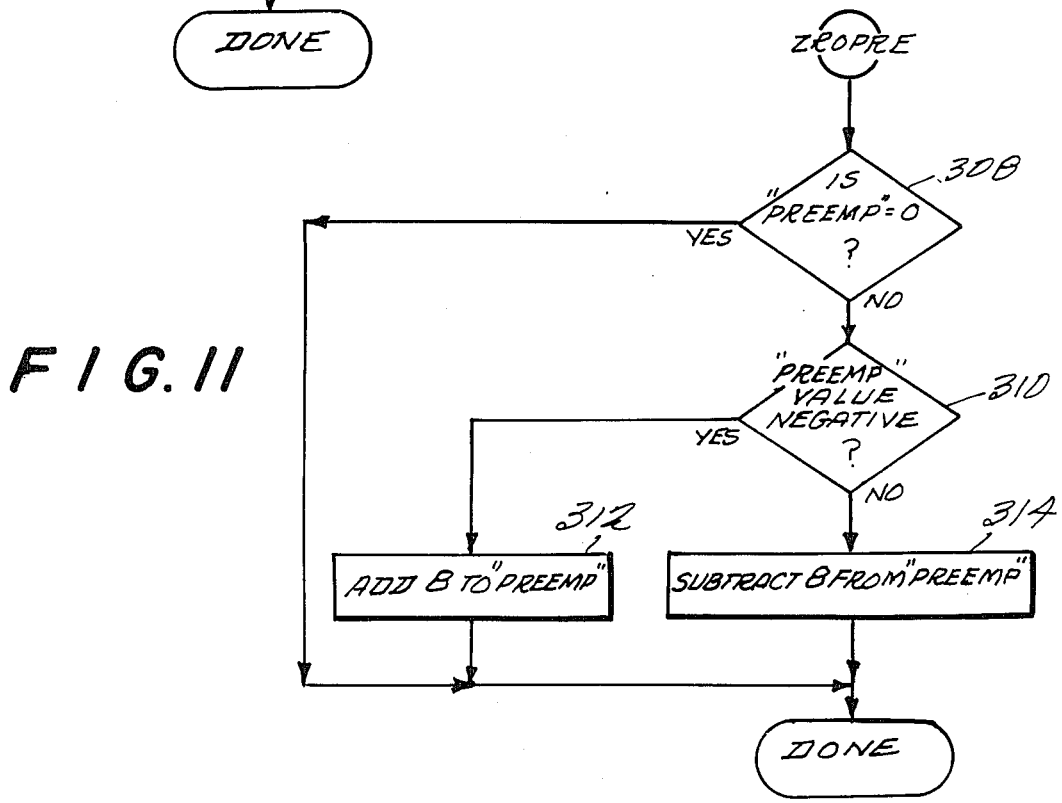

If step 300 determines that the value applied to digital-to-analog converter 126 is already at a maximum, the "ZROPRE" sub-routine is performed, which sub-routine is illustrated in FIG. 11. If the value is at a maximum, it cannot be further increased. Since no further increasing is being performed, any pre-emphasis which has been added to the speed of slave recorder 104 must be decreased. Accordingly, at step 308, it is determined whether the pre-emphasis value is zero. If it is zero, no further processing is necessary and the interrupt routine ends. If step 308 determines that the pre-emphasis value is not zero, step 310 determines whether the pre-emphasis value is negative. Whether it is negative or positive, the pre-emphasis value should approach zero. Accordingly, if step 310 determines that the pre-emphasis value is negative, step 312 adds 8 to the pre-emphasis value. If step 310 determines that the pre-emphasis value is positive, step 314 subtracts 8 from the pre-emphasis value. Steps 312 and 314 end the interrupt routine.

The discussion of the CHDIR, DECDAC, INCDAC and ZROPRE sub-routines in FIGS. 8 through 11 was prompted by a discussion of steps 270 through 276 (FIG. 7) with respect to the situation where the tape in master recorder 102 and the tape in slave recorder 104 are moving in opposite directions away from each other. The CHDIR sub-routine is executed to reverse the direction of slave recorder 104.

Suppose the determination of step 274 is positive or the determination of step 276 is negative. In this situation, the tape in master recorder 102 and slave recorder 104 are moving in opposite directions, but are moving toward each other. The obvious goal is to gradually slow down slave recorder 104 and eventually reverse its direction so that its position and speed match that of master recorder 102.

To accomplish this, step 316 looks at the register "SPDDIF". At step 256, in FIG. 6, just before entering the OFFCHK sub-routine, this register was provided with a value representing the speed at which the slave was moving with respect to the master. It is desired to limit this speed to a controllable value once the OFFCHK sub-routine is entered, which can only occur when the time-code of master recorder 102 is within one second of the time-code of slave recorder 104 (see step 258 in FIG. 7). Accordingly, if the most significant bit of the value stored in SPDDIF is not zero, as determined by step 316, the DECDAC sub-routine is entered (see FIG. 9) which, as described above, decreases the value applied to digital-to-analog converter 126 to slow the speed of slave recorder 104.

If step 316 determines that the most significant bit of the speed value is zero, it is then necessary to control slave recorder 104 with respect to the OFFSET SPDDIF table illustrated in FIG. 7. That is, the speed of slave recorder 104 is maintained below the maximum limit set in the table which is dependent upon the separation between the tapes of master recorder 102 and slave recorder 104. As long as the speed value is below the maximum set forth in the table as determined by step 318 and, in fact, more than a predetermined value below the maximum speed set in the table as determined by 320, the ZROPRE sub-routine is entered (see FIG. 11) which, as discussed above, simply removes pre-emphasis from the indication of slave speed without changing any control of slave recorder 104.

If step 320 determines that, as master and slave approach each other so that the maximum speed decreases, the speed value approaches the maximum value set in the table, step 320 causes the DECDAC sub-routine (see FIG. 9) to be entered which causes the control signal applied to digital-to-analog converter 126 to decrease, thus slowing slave recorder 104.

It can be seen from the table of FIG. 7 that as the difference in position between the slave and master approaches zero, the maximum permissible difference in speed also decreases. Thus, in view of the speed of master 102 alone, the sum of the speed of master recorder 102 and slave recorder 104 will eventually exceed the maximum set in the table. When this occurs, step 318 will cause the CHDIR sub-routine (see FIG. 8) to be executed which, over repeated executions, will cause slave recorder 104 to stop and then reverse directions.

The discussion above completes the explanation of the control performed by the OFFCHK sub-routine when the tapes of master recorder 102 and slave recorder 104 are moving in opposite directions. If it is determined at step 270 in FIG. 7 that slave recorder 104 is moving in the same direction as master recorder 102, step 322 determines whether they are both going forward. If they are both going forward and the slave is ahead of the master as determined at step 324 but the master is slower than the slave as determined in step 326, then it is necessary to slow slave recorder 104 to allow master recorder 102 to catch up. This is accomplished by execution of the DECDAC sub-routine (see FIG. 9) after step 326 which decreases the speed of slave recorder 104. Similarly, if step 322 determines that both master and slave are moving in reverse, step 328 determines that the slave is behind the master and step 326 determines that the master is slower than the slave, then it is also necessary to slow slave recorder 104 to allow master recorder 102 to catch up.

Suppose that step 322 determines that both master and slave are going forward, step 324 determines that the slave is ahead of the master and step 326 indicates that master is faster than the slave. Then the master is catching the slave. As the master position approaches the slave position, the slave speed should gradually increase so that the slave will then track along at the same position as the master. Similarly, if step 322 determines that both slave and master are in reverse, step 328 determines that the slave is behind the master but step 326 determines that the master is faster than the slave, then the master is also catching the slave and the speed of the slave should gradually increase so that eventually both position and speed of the two recorders match. To this end, step 330 determines whether the difference in speeds between master and slave is relatively small. If the difference in speed is not relatively small, the INCDAC sub-routine (see FIG. 10) is executed until the speed of slave recorder 104 is increased to a value close to that of master recorder 102.

Once step 330 determines the speeds to be relatively close, the speed of slave recorder 104 is controlled in accordance with the table of FIG. 7. Thus, as long as the speed difference is not near the maximum value determined by the table, the speed of slave recorder 104 is not changed as controlled by step 332 and the ZROPRE sub-routine illustrated in FIG. 11. However, as the positions of the tapes of master recorder 102 and slave recorder 104 approach the same position, the permissible maximum speed between master recorder 102 and slave recorder 104 becomes very small. As the actual speed difference exceeds the table, step 334 causes the INCDAC sub-routine (see FIG. 10) to be executed so that the speed of slave recorder 104 more closely approaches the speed of master recorder 102.

If step 322 determines that both master and slave are going in the same direction, step 324 determines that the slave is behind the master, but step 336 determines that the master is faster, then the master is pulling away from the slave. Similarly, if step 322 determines that both slave and master are in reverse, step 328 determines that the slave has a time-code number higher than that of the master, but step 336 determines that the master is moving faster, the master is also pulling away from the slave. In either case, step 336 causes the INCDAC sub-routine to be executed to increase the speed of slave recorder 104.

If the determination at step 336 is positive, it means that the slave is gradually approaching the position of master recorder 102. Accordingly, all that is necessary is to gradually decrease the speed of slave recorder 104 until both the speed and position of the two recorders match. This is accomplished by steps 316, 318 and 320 in the manner described above.

Figure 6:
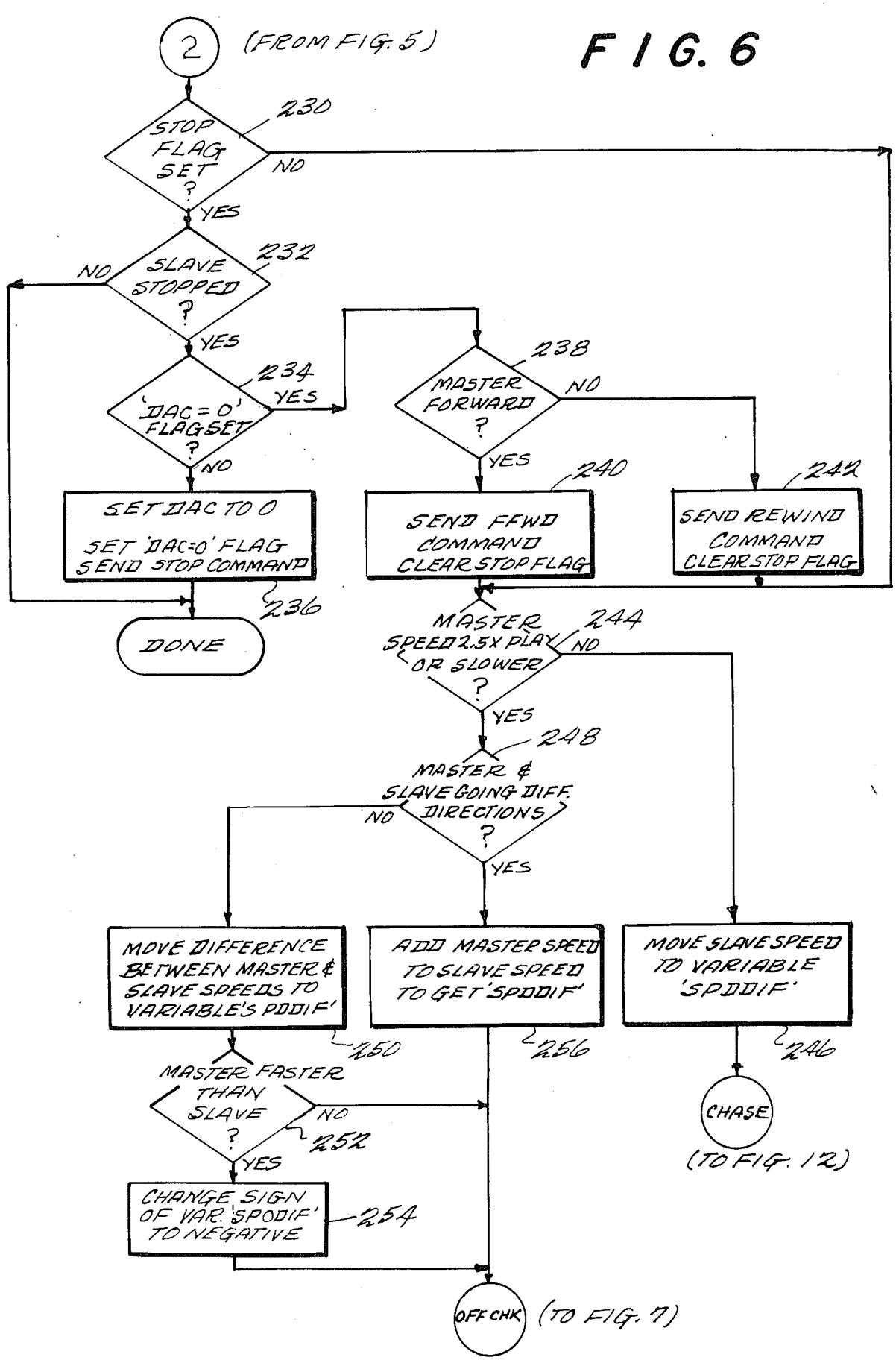

Suppose step 244 in FIG. 6 (illustrating the even 20 millisecond interrupt routine) determines that the speed of master recorder 102 is greater than 2.5 times nominal play speed or step 258 in the OFFCHK sub-routine of FIG. 7 determines that the time-code of the master and slave are separated by more than one second. In these instances, it will be necessary to move the tape on slave recorder 104 at high speeds. High speed control is performed in a unique manner by the CHASE sub-routine illustrated in FIG. 12.

The object of control in the CHASE subroutine is to prevent slave recorder 104 from overshooting the position of master recorder 102 should master recorder 102 suddenly be stopped. A problem exists in that slave recorder 104 might have a great deal more inertia than master recorder 102. The situation may be likened to a truck following a sports car. At low speed, the truck may follow fairly closely behind the sports car and still be able to stop should the sports car stop. However, at higher speeds, the truck must lag behind the sports car by an ever-increasing amount if the truck is to stop at a position behind the sports car should the sports car stop.

Figure 17:
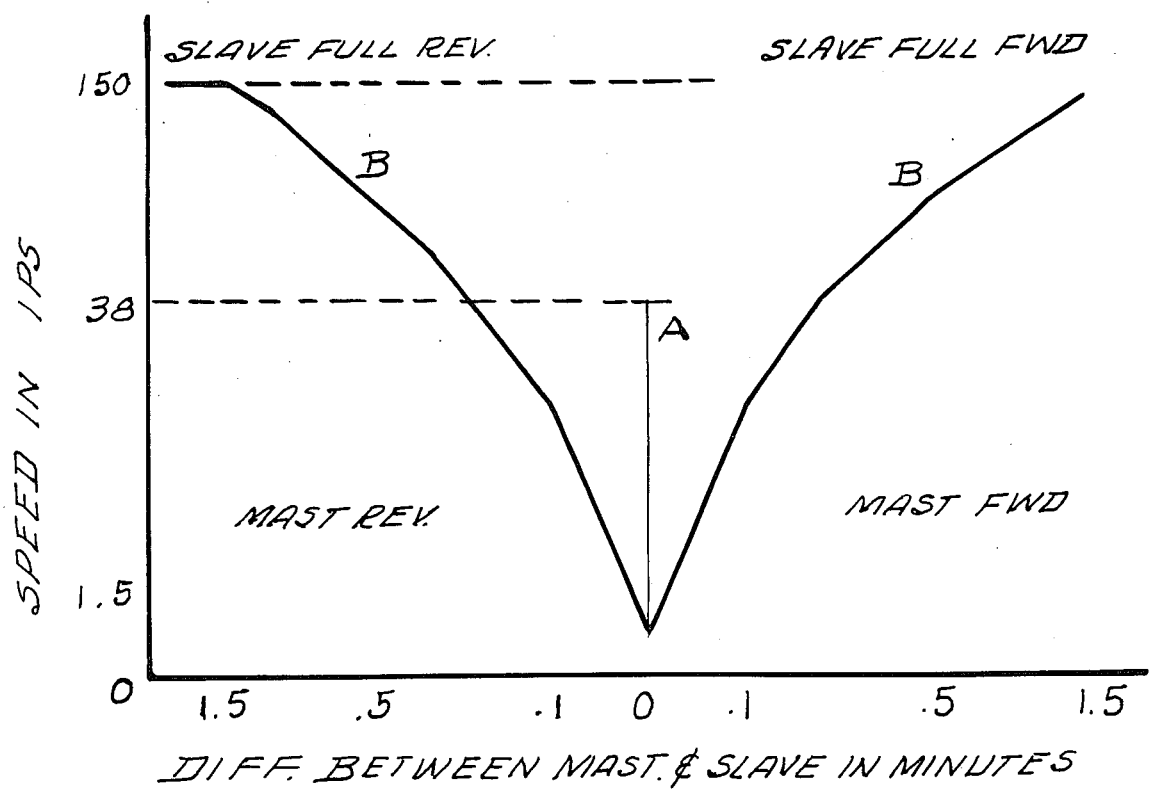
FIG. 17 is a graph illustrating the manner of operation of the present invention.

The manner in which slave recorder 104 is controlled is graphically illustrated in FIG. 17. Two ballistic curves are employed in controlling slave recorder 104. These play a significant role in realizing the capabilities of synchronizer 100. The transfer function represented by curve A is used when the speed of master recorder 102 is between 0.1 and 2.5 times nominal play speed. In this range, the inertia of the slave tape reels is not so significant as to cause unacceptable slave overshoot when the master is suddenly stopped. Therefore, curve A causes the position of the tape of slave recorder 104 to match exactly the position of the tape of master recorder 102. This control is achieved through the OFFCHK sub-routine illustrated in FIG. 7 and described above and the RESOLVE sub-routine illustrated in FIG. 14 and described below.

Curve B is employed when master recorder 102 is moved at a rate higher than 2.5 times nominal play speed. As the tape in slave recorder 104 moves faster, the tape in slave recorder 104 is positioned ever further away from the tape in master recorder 102 in such a fashion that an ideal trajectory for overshoot-free parking of slave recorder 104 is always possible even when master recorder 102 stops abruptly. This second type of ballistic control is achieved in the CHASE sub-routine illustrated in FIG. 12.

This bilateral approach has the advantage that, in the speed range where intelligibility is possible, about 0.1 to 2.5 times nominal play speed, there is the equivalent of sprocket lock between the master and the slave, allowing the operator to immediately determine the relationship between visual and aural cues while the video master is being rocked back and forth. Once the master is moving above 2.5 time nominal play speed, however, the second ballistic control scheme is used, resulting is complete freedom from hunting and overshoot of the slave, while allowing slave parking to within one frame of the master's final destination.

Control in accordance with curves A and B is achieved through the use of look-up tables. Thus, the OFFSET SPDDIF table illustrated in FIG. 7 and employed in the OFFCHK sub-routine causes control in accordance with curve A. As described above with respect to the OFFSET SPDDIF table, the time-code differential between master and slave is used to point to a speed value that slave recorder 104 is to be driven at. At any point that master recorder 102 is running below 2.5 times nominal play speed, synchronizer 100 will attempt to keep the positional differential at zero. If the master runs above 2.5 times nominal play speed, the speed of slave recorder 104 is employed to access a table which stores curve B in FIG. 17. The output of that table is a desired slave tape position relative to the master tape position.

Figure 12:
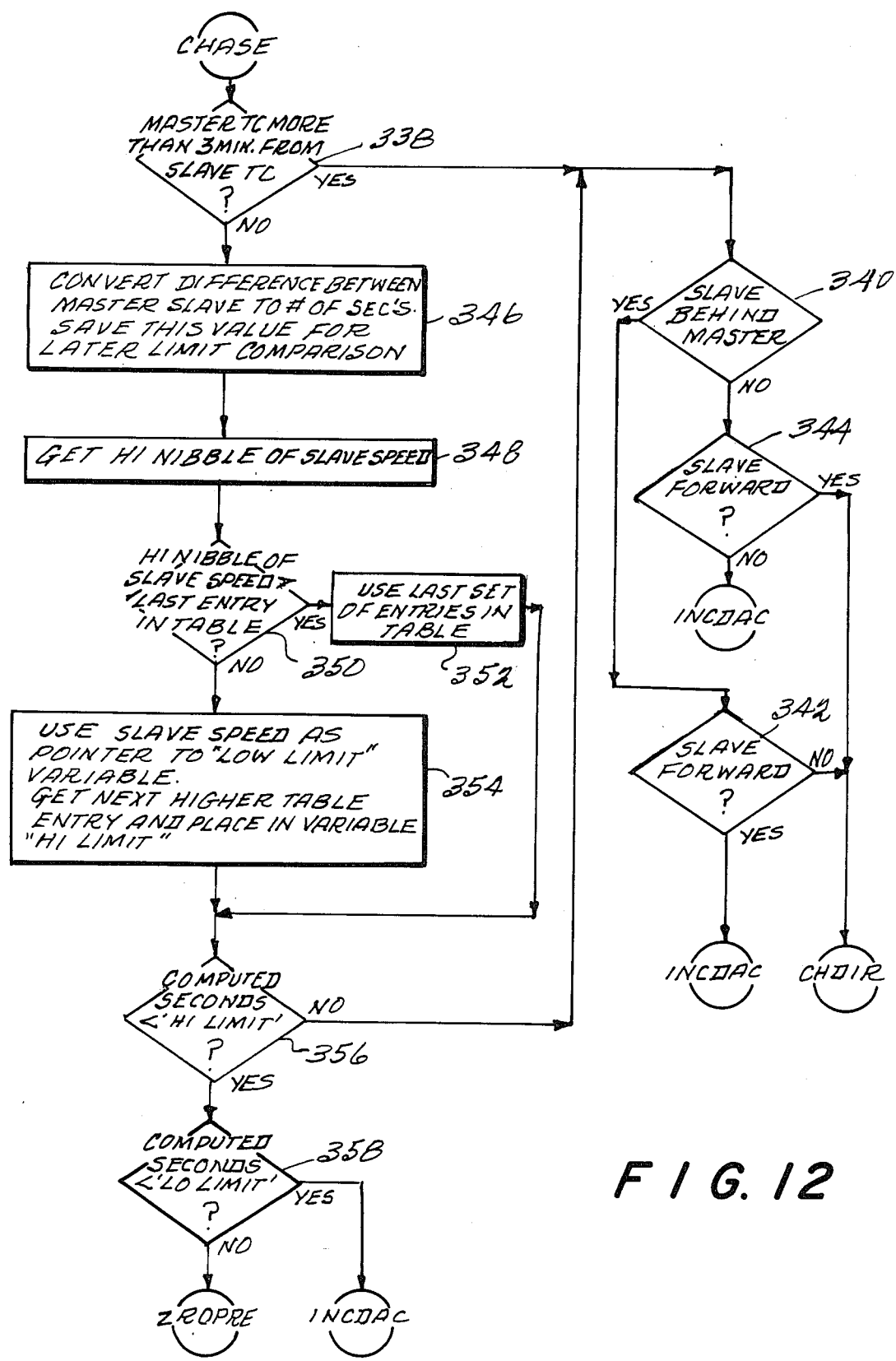

Turning to the CHASE sub-routine illustrated in FIG. 12, step 338 determines whether the time-code of master recorder 102 is within three minutes of the time-code of slave recorder 104. If the difference in position is more than three minutes, then the speed of slave recorder 104 will be increased to a maximum. Thus, if step 340 determines that the time-code number of slave recorder 104 is less than the time-code number of master recorder 102 and step 342 determines that slave recorder 104 is moving forward, then the INCDAC sub-routine is executed (see FIG. 10) to increase the speed of slave recorder 104. If step 340 determines that the time-code of slave recorder 104 is greater than the time-code of master recorder 102 and step 344 determines that slave recorder 104 is moving in reverse, then again the INCDAC sub-routine is executed to increase the speed of slave recorder 104.

If the determination of step 344 is positive or the determination of step 342 is negative, it means that the slave and master tapes are moving away from each other. Accordingly, the CHDIR sub-routine (see FIG. 8 and related discussion above) is executed to change the direction of slave recorder 104.

If step 338 determines that the time-codes of master recorder 102 and slave recorder 104 are within three minutes, more careful control of the relationship between slave recorder 104 and master recorder 102 is required. Accordingly, at step 346, the difference between the time-codes of the master and slave is converted to a number of seconds to be used later for limit comparison. At step 348, the most significant portion of the slave speed is obtained. This portion of the slave speed will be used to address a table which stores the appropriate following distance as indicated by curve B in FIG. 17.

If step 350 determines that the slave speed is greater than the last speed entry in the table, then the last entry in the table is retrieved in step 352. If step 350 determines that the slave speed is less than the last entry in the table, then at step 354, the slave speed is used as a pointer to obtain a lower limit and the next higher table entry is employed as an upper limit.

Then, at steps 356 and 358, the distance between master and slave positions, in terms of seconds, is compared to the upper and lower limits. If step 356 determines that the separation is greater than the upper limit, then the speed of slave recorder 104 is increased through steps 340 through 344. If steps 356 and 358 determine that the actual separation between master and slave positions is between the upper and lower limits, then step 358 causes the ZROPRE sub-routine to be executed, which as illustrated in FIG. 11 and described above, does not change the manner in which slave recorder 104 is controlled but merely decreases the pre-emphasis applied to the slave speed. If step 358 determines that the separation is less than the lower limit, then it causes the INCDAC sub-routine, illustrated in FIG. 10 and discussed above, to be executed which increases the speed of slave recorder 104.

The entire discussion of the even 20 millisecond interrupt routine presented above is predicated upon the fact that master recorder 102 is moving as determined by step 228 in FIG. 5. If step 228 determines that master recorder 102 has stopped, then it is necessary to bring slave recorder 104 to a stop in a graceful manner such that the position of the slave tape matches the position of the master tape. To this end, step 360 determines whether the stop flag has been set. The stop flag is set only when slave recorder 104 has come to a stop at a position within one frame of the position of master recorder 102. Thus, if master recorder 102 has just stopped, step 360 will determine that the stop flag has not been set so that the PRKCHK sub-routine is executed.

Figure 13:
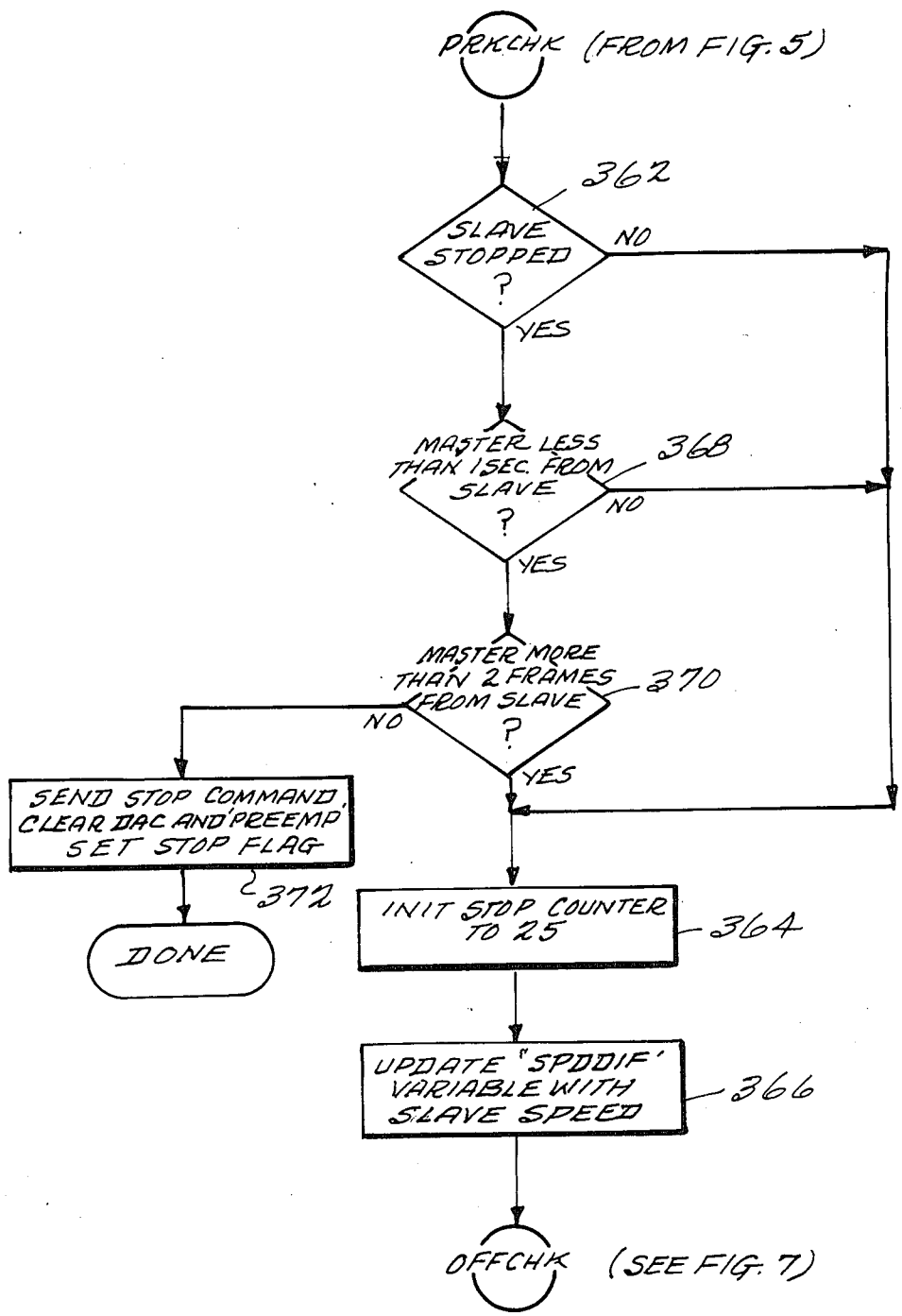

As illustrated in FIG. 13, the PRKCHK sub-routine begins with step 362 determining whether or not the slave has stopped. If it has not stopped, step 364 initializes a stop counter to 25. This stop counter is gradually decremented during the stopping process to allow slave recorder 104 a chance to settle down before control over slave recorder 104 is released. In step 366, the variable SPDDIF is updated with the slave speed.

Then, the OFFCHK sub-routine, illustrated in FIG. 7 and largely described above, will be executed.

The purpose of executing the OFFCHK sub-routine at this point is to cause the time codes of slave recorder 104 and master recorder 102 to match. In FIG. 7, step 268 will determine that master recorder 102 has stopped. Thereafter, steps 272 through 276 and steps 316 through 320 will control slave recorder 104 so that slave recorder 104 stops within one frame of master recorder 102.

If, in FIG. 13, step 362 determines that slave recorder 104 has stopped, step 368 determines whether the time-code of master recorder 102 is within one second of the time-code of slave recorder 104. If not, the OFFCHK sub-routine is executed after steps 364 and 366 to bring slave recorder 104 to a stop at the position master recorder 102. If the time-codes of master recorder 102 and slave recorder 104 are within one second, then step 370 determines whether the master and slave have stopped more than two frames apart. If they have, it is necessary to move slave recorder 104 to a position closer to master recorder 102, so steps 364 and 366 and the OFFCHK sub-routine are executed.

If slave recorder 104 has stopped within two frames of master recorder 102, then slave recorder 104 has stopped in an acceptable position. Accordingly, at step 372, CPU 120 sends a stop command to slave recorder 104, digital-to-analog converter 126 is cleared, any pre-emphasis is cleared and the stop flag is set. This ends this pass through the even 20 millisecond interrupt routine.

On the next pass, in FIG. 5, the determinations at steps 228 and 360 will both be positive. Accordingly, CPU 120 will determine at step 374 whether the "DAC=0" flag is set. Note that although step 372 in the PRKCHK sub-routine illustrated in FIG. 13 clears the DAC, the special flag "DAC=0" has not yet been set. Accordingly, step 376 decrements the stop counter and step 378 determines whether the stop counter is zero. Remember that the stop counter was initialized to 25 in step 364 of FIG. 13 (the PRKCHK sub-routine). Thus, initially the determination at step 378 will be negative so that the even 20 millisecond interrupt routine ends. Eventually, repeated decrementation of the stop counter at step 376 will produce a zero stop count so the determination at step 378 will be positive. As a result, the settling time for slave recorder 104 will be at an end. Therefore, at step 380, the "DAC=0" flag is cleared and synchronizer 100 releases control of slave recorder 104. Thereafter, slave recorder 104 may be moved by hand or through a manual operation of its controls without any resistance by synchronizer 100.

Until master recorder 102 is moved again, processing passes during each even 20 millisecond interrupt routine through steps 228, 360 and 374 to the end.

As will be recalled from steps 200 through 214 in FIG. 5, if it is determined that the speed of master recorder 102 is within the range which resolver 130 is designed to handle, the speed of master recorder 102 and slave recorder 104 are within 15 units of each other, the time-codes of the master and slave are within two frames of each other and these conditions have existed for a certain time determined by the resolve entry counter, step 216 sets digital-to-analog converter 160 of resolver 130 (see FIG. 3) to the speed of slave recorder 104, a play command is sent to slave recorder 104, the play flag is set and resolver 130 is enabled. Microprocessor 120 then executes the RESOLVE sub-routine illustrated in FIG. 14 which controls the operation of synchronizer 100 when this close matching between the master and slave is achieved.

Figure 14:
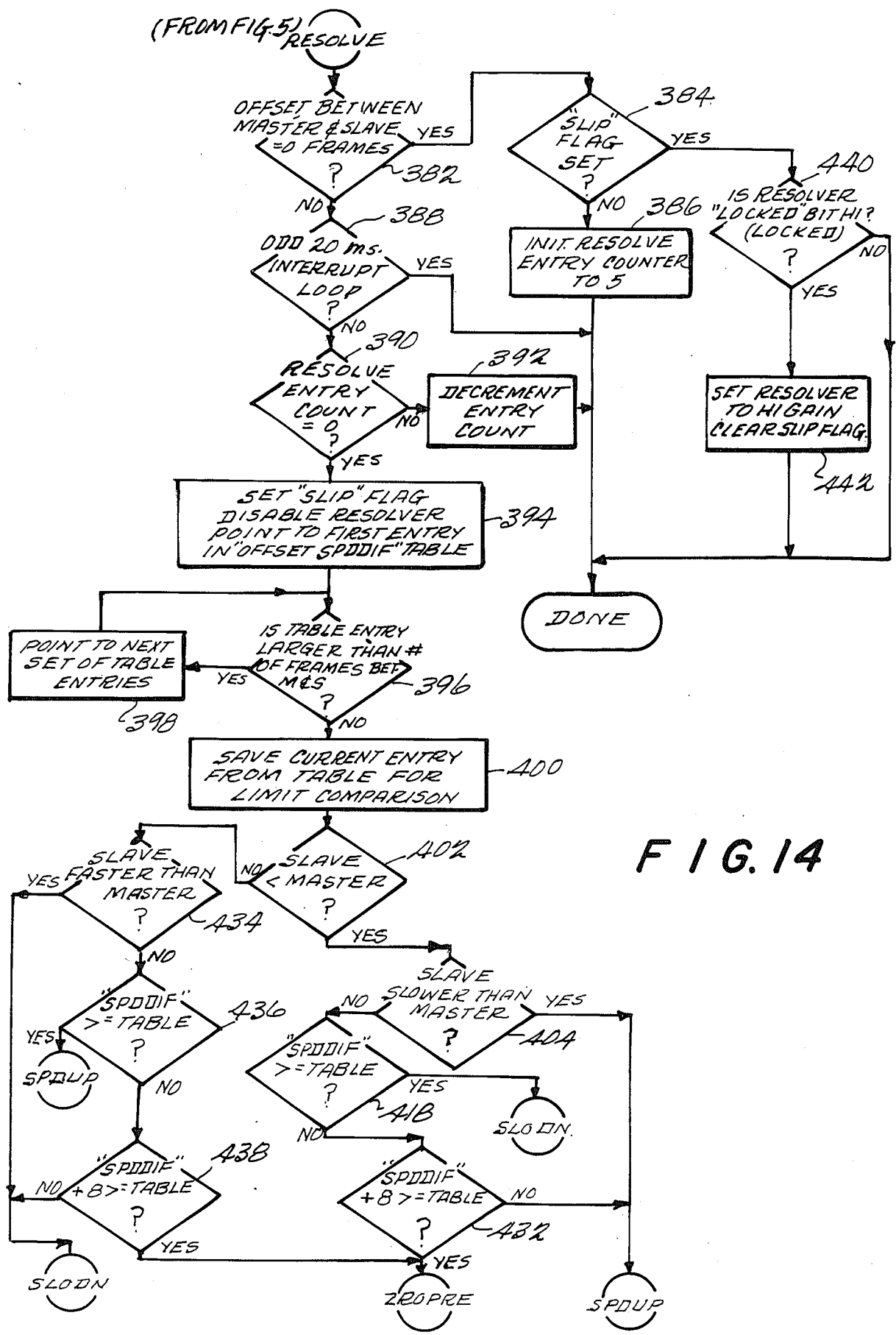

Turning now to FIG. 14, CPU 120 first checks whether the time-codes of master and slave indicate the same frame at step 382. This determination is positive when resolver 130 is effectively controlling slave recorder 104. Next, step 384 determines whether the slip flag has been set. As will be described below, the slip flag is set when something happens to cause resolver 130 to introduce at least one frame difference between the position of master and slave. Assuming step 384 determines that the slip flag has not been set, step 386 re-initializes the entry counter to 5 and the even 20 millisecond interrupt routine ends.

If step 382 determines that at least one frame difference does exist between the time-codes of master and slave, step 388 determines whether an even or odd interrupt routine is being executed. The RESOLVE sub-routine is accessed in both interrupts. If it is being accessed in an odd interrupt, the routine ends. If it is being accessed in an even interrupt, it is determined at step 390 whether the resolve entry count is zero. If it is not, step 392 decrements the enter count and the routine ends.

If, even after the settling period provided by the resolve entry counter, the time-codes of the slave and master are more than one frame apart, the determination at step 382 will be negative and the determination at step 390 will be positive. Accordingly, at step 394, the slip flag is set, the resolver is disabled and the OFFSET SPDDIF table is accessed. This is the table illustrated in FIG. 7. With this step, the phase comparison performed by resolver 130 no longer controls the operation of synchronizer 100. Instead, slave recorder 104 will be controlled by the AC signal applied to the capstan of slave recorder 104 by adjusting the speed preset applied to digital-to-analog converter 160 (see FIG. 3) from CPU 120. Then, steps 396 and 398 determine which entry of the OFFSET SPDDIF table from FIG. 7 is appropriate given the number of frames separating master and slave time-codes. The speed entry from the table is retained in step 400.

CPU 120 now commences to control the speed of the capstan motor of slave recorder 104 by adjusting the preset applied to digital-to-analog converter 160. Thus, at step 402, it is determined whether the time-code of the slave is less than the time-code of the master. If it is, step 404 determines whether slave recorder 104 is moving more slowly than master recorder 102. If the determinations at steps 402 and 404 are both positive, slave recorder 104 is behind master recorder 102 and falling further behind. Therefore, it is necessary to speed up slave recorder 104. To accomplish this result, the SPDUP sub-routine is executed as illustrated in FIG. 15.

Figure 15:
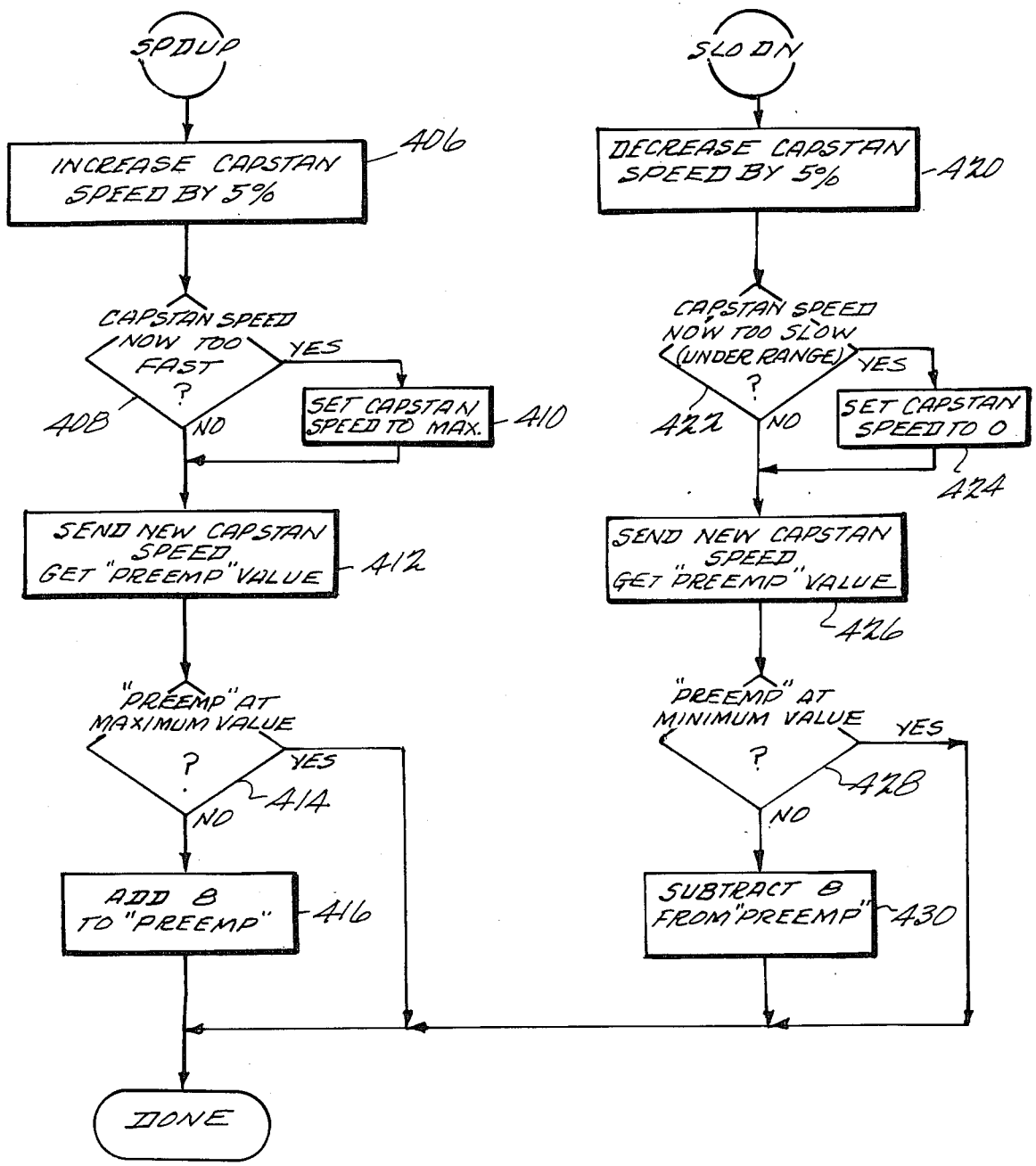

In FIG. 15, step 406 causes the capstan speed to increase by 5%. A maximum limit does exist for the capstan speed. Step 408 determines whether this maximum has been exceeded. If it has been exceeded, the capstan speed is set to the maximum at step 410. At step 412, the new capstan speed is sent to slave recorder 104 and the pre-emphasis value is retrieved. At step 414, it is determined whether the pre-emphasis value has reached its maximum. If it has, the sub-routine and the 20 millisecond interrrupt routine ends without adjusting the pre-emphasis value. However, if step 414 determines that the pre-emphasis is not at its maximum, step 416 increments the pre-emphasis value by 8 before the sub-routine and the interrupt routine end. Recall that pre-emphasis is added to the determined speed of slave recorder 104 to cause CPU 120 to believe that slave recorder 104 is responding to its commands more quickly than it actually can.

If step 402 (see FIG. 14) determines that the slave time-code is less than the master time-code and step 404 determines that the slave is moving faster than the master, then slave recorder 104 is approaching master recorder 102. The speed of slave recorder 104 should gradually decrease so that both the speed and position of slave recorder 104 matches those of master recorder 102. Accordingly, step 418 determines whether the difference in speed between the slave and master is greater than the maximum amount allowed by the OFFSET SPDDIF table. If the speed difference is greater than the allowable maximum, then the SLODN sub-routine, illustrated in FIG. 15, is executed.

In FIG. 15, the SLODN sub-routine begins with step 420 in which capstan speed is decreased by 5%. Step 422 determines whether the capstan speed is below it minimum. If it is, step 424 sets the capstan speed to zero. In step 426, the new capstan speed is sent to slave recorder 104 and the pre-emphasis value is obtained. Step 428 determines whether the pre-emphasis value is at its minimum. If so, it cannot be further decreased so both the sub-routine and the interrupt routine end. If the pre-emphasis value is not at its minimum, step 430 subtracts 8 from the pre-emphasis value.

If step 418 (see FIG. 14) determines that the speed difference between master and slave is within the table but step 432 determines that the speed difference is not near the top of the table, the capstan speed needs to be increased so the SPDUP sub-routine, illustrated in FIG. 15 and described above, is executed.

If steps 418 and 432 result in a determination that the speed difference is within the table and, in fact, near the top of the table, the speed of slave recorder 104 need not be altered. Accordingly, the ZROPRE sub-routine, illustrated in FIG. 11 and described above, is executed. Recall that this sub-routine does not change the speed of slave recorder 104, but merely causes the pre-emphasis value to approach zero.

Suppose step 402 determines that the slave time-code is greater than the master time-code. Then step 434 will determine whether or not the speed of slave recorder 104 is faster than the speed of master recorder 102. If the determination at step 402 is negative and the determination at step 434 is positive, slave recorder 104 is ahead of master recorder 102 and pulling further ahead. Therefore, sub-routine SLODN, illustrated in FIG. 15, is executed to reduce the speed of slave recorder 104. If step 434 determines that the master speed is faster than the slave speed, then the slave is ahead but the master is catching up. The slave speed should be controlled so that it increases as the master approaches to ultimately cause both the slave and master to have the same position and speed. This is accomplished by means of the OFFSET SPDDIF table. Accordingly, step 436 determines whether the speed difference between slave and master is greater than the maximum value provided by the table. If so, it is necessary to speed up slave recorder 104 so that master recorder 102 does not overtake it too quickly. Accordingly, the SPDUP sub-routine, illustrated in FIG. 15, is executed. If step 436 determines that the speed difference is less than the maximum, step 438 determines whether the difference is close to the maximum. If it is, master recorder 102 is approaching slave recorder 104 at an appropriate speed so the ZROPRE sub-routine is executed (see FIG. 11) which does not change the speed of slave recorder 104. However, if step 438 determines that the speed difference is very small, then master recorder 102 will not catch slave recorder 104 fast enough. Accordingly, the SLODN sub-routine, illustrated in FIG. 15, is executed to slow down slave recorder 104 to allow master recorder 102 to catch up more quickly.

Through the repeated process performed by steps 394 through 438, the position and speed of slave recorder 104 matches that of master recorder 102. Ultimately, step 382 will determine that the time-codes of master recorder 102 and slave recorder 104 indicate the same frame. Step 384 will then determine that the slip flag is still set, since it has not yet been cleared. Step 440 determines whether resolver 130 is producing a signal indicating lock between master and slave. If no lock exists, the sub-routine and interrupt routine end. If step 440 determines that resolver 130 is locked, step 442 sets the resolver to high gain and the slip flag is cleared before the sub-routine and interrupt routine end. As mentioned previously, the resolver is set to high gain by increasing the permissible number of clock pulses applied to counter 144 (see FIG. 3).

Figure 16:
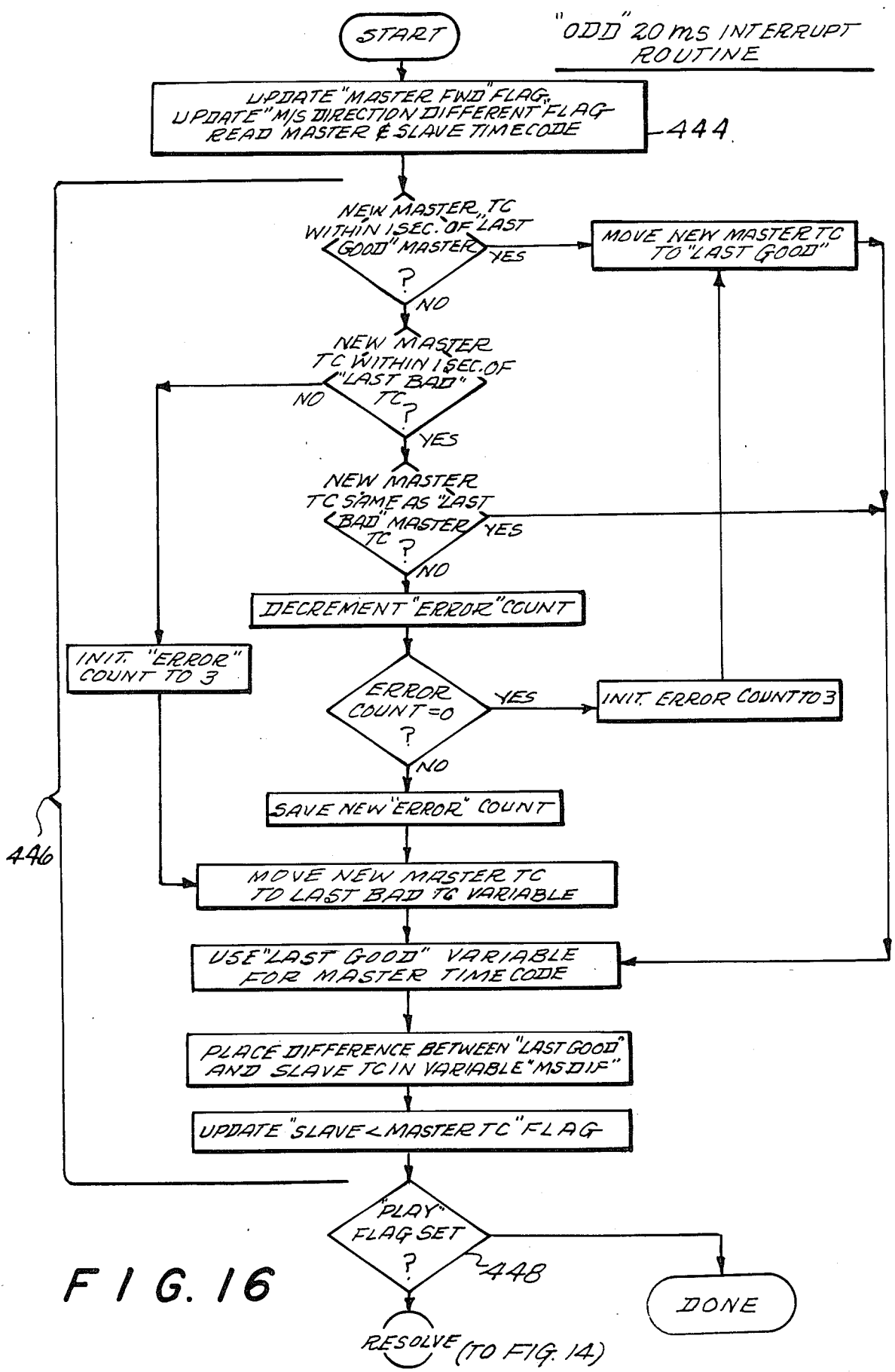

FIG. 16 illustrates the odd 20 millisecond interrupt routine. Recall that this interrupt routine is performed every 20 milliseconds alternately with the even 20 millisecond interrupt routine. Step 444 in FIG. 16 updates the master forward flag and the master/slave direction different flag. Also, time-code is obtained from readers 108 and 112 (see FIG. 2). Then, the time-code from master recorder 102 is checked for errors in the steps collectively referenced with numeral 446. These steps correspond exactly with steps 176 through 198 illustrated in FIG. 4 and described above. At step 448, it is determined whether the play flag has been set, indicating that control of slave recorder 104 is by AC signal applied to the capstan motor of slave recorder 104. If the play flag is not set, the interrupt routine ends. If the play flag is set, the RESOLVE sub-routine, illustrated in FIG. 14 and described above, is executed and the interrupt routine ends.

At steps 174 in FIG. 4 and 444 in FIG. 16, time-codes are read. It was indicated that this reading occurs from readers 108 and 112. However, instances occur when master recorder 102 cannot provide wide-band time-code, either because of poor frequency response or because the operator chooses not to allow tape to contact the reading head in fast-wind modes. In these cases, synchronizer 100 is capable of using master tach pulses applied to latch 122 (see FIG. 2) in addition to time-code. At the option of the user, the switch from using time-code to tach pulses is done whenever the speed of master recorder 102 exceeds 2.5 times, play speed. The master tach pulses are converted by CPU 102 into address information instead of time-code from master recorder 102.

Although only a few exemplary embodiments of this invention has been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. Apparatus for synchronizing a slave device for driving a slave medium with a master device for driving a master medium comprising:
   first means for monitoring the position of said master medium;
   second means for monitoring the position of said slave medium;
   at least one said first and second means also for monitoring the speed of at least one of said master medium and slave medium; and
   means for controlling said slave device so that said slave medium assumes a position a desired distance behind said master medium position, said desired distance increasing as one of said slave medium and said master medium speed increases to prevent excessive overshoot by said slave medium when said master medium is stopped.

2. Apparatus as in claim 1, wherein said first monitoring means also monitors the speed of said master medium and said controlling means causes said desired distance to be zero when the speed of said master medium is below a predetermined value.

3. Apparatus as in claim 1, wherein both said monitoring means include hard-wired time code reading gate assemblies for determining speed from clock pulses read from said medium and for determining the positions of said media from time data read from said media.

4. Apparatus as in claim 1, wherein said master device and said slave device are tape recorders and said master medium and said slave medium are tape.

5. Apparatus for synchronizing a slave device for driving a slave medium with a master device for driving a master medium, said slave device and said master device including reading means for reading timing data from said slave medium and said master medium, respectively, said apparatus comprising:
   first means for determining the speed of said slave medium from clock pulses extracted from said timing data from said slave device reading means and for determining the position of said slave medium from time code extracted from said timing data from said slave device reading means;
   second means for determining the speed of said master medium from clock pulses extracted from said timing data from said master device reading means and for determining the position of said master medium from time code extracted from said timing data from said master device reading means; and
   means for controlling said slave device in response to both said speed and said position of both said slave medium and said master medium so that said slave medium matches both the position and speed of said master medium.

6. Apparatus as in claim 5, wherein said controlling means controls said slave device so that said slave medium matches both the position and speed of said master medium when said master medium is at a speed less than a predetermined value, and controls said slave device so that said slave medium assumes a position a desired distance behind said master medium position when said master medium has a speed greater than said predetermined value, said desired distance increasing as one of said slave medium and master medium speed increases to prevent excessive overshoot by said slave medium when said master medium is stopped.

7. Apparatus as in claim 5, wherein said controlling means includes a hard-wired resolver gate assembly, responsive to said time codes from both said slave medium and said master medium, for controlling said slave device in response to the phase difference between indications derived from said master medium time code and said slave medium time code.

8. Apparatus as in claim 7, wherein said resolver gate assembly includes:
   phase comparator means responsive to said indications, for generating an up-down signal having a first characteristic when said indication from said slave medium leads said indication from said master medium and having a second characteristic when said indication from said slave medium lags said indication from said master medium;
   means for counting pulses in a direction determined by said first and second characteristics of said up-down signal; and
   means for generating a control signal for controlling said slave device in response to a counting output of said counting means.

9. Apparatus as in claim 5, wherein:
   said first means includes a hard-wired time code reading gate assembly for determining the speed of said slave medium from clock pulses extracted from said timing data from said slave device reading means and for determining the position of said slave medium from time code extracted from said timing data from said slave device reading means; and
   said second means includes a hard-wired time code reading gate assembly for determining the speed of said master medium from clock pulses extracted from said timing data from said master device reading means and for determining the position of said master medium from time code extracted from said timing data from said master device reading means.

10. Apparatus as in claim 5, wherein said master device and said slave device are tape recorders and said master medium and said slave medium are tape.

11. Apparatus for synchronizing a slave device for driving a slave medium with a master device for driving a slave medium, said slave device and said master device including reading means for reading timing data from said slave medium and said master medium, respectively, said apparatus comprising:
   a hard-wired time code reading gate assembly for determining the position of said slave medium from said reading data read from said slave device reading means and for determining the speed of said slave medium from clock pulses extracted from said timing data from said slave device reading means;
   a hard-wired time code reading gate assembly for determining the position of said master medium from said timing data read from said master device reading means and for determining the speed of said master medium from clock pulses extracted from said timing data from said master device reading means;
   a hard-wired resolver gate assembly, responsive to both said time code reading gate assemblies, for controlling said slave device in response to said timing data from said master and slave media; and
   processing means, responsive to both said time code reading gate assemblies, for: (a) causing said resolver gate assembly to control said slave device when the position of said slave medium is close to the position of said master medium and the speed of said master medium is below a predetermined value, and (b) controlling said slave device directly when the position of said slave medium is not close to the position of said master medium.

12. Apparatus as in claim 11, wherein said processing means controls said slave device so that said slave medium assumes a position a desired distance behind said master medium position when said master medium has a speed greater than a predetermined value, said desired distance increasing as said slave medium speed increases to prevent excessive overshoot by said slave medium when said master medium is stopped.

13. Apparatus as in claim 11, wherein said resolver gate assembly includes:
   phase comparator means, responsive to said timing data from said slave medium and said master medium, for generating an up-down signal having a first characteristic when indications derived from said timing data from said slave medium lead indications derived from said timing data from said master medium and having a second characteristic when said indications from said slave medium lag said indications from said master medium;
   means for counting clock pulses in a direction determined by said first and second characteristics of said up-down signal; and
   means for generating a signal for controlling said slave device in response to a counting output of said counting means.

14. Apparatus as in claim 13, wherein said resolver gate assembly further comprises means for controlling the application of clock pulses to said counting means to control the gain of said resolver gate assembly.

15. Apparatus as in claim 11, wherein said slave device and said master device are tape recorders and said slave medium and said master medium are tape.

16. Apparatus for synchronizing a slave tape on a slave tape recorder with a master tape on a master tape recorder, said slave tape recorder and said master tape recorder including reading means for reading timing data from said slave tape and said master tape, respectively, said apparatus comprising:
   a hard-wired time code reading gate assembly for determining the speed of said slave tape from clock pulses extracted from said timing data from said slave tape recorder reading means and for determining the position of said slave tape from time code extracted from said timing data from said slave tape recorder reading means;
   a hard-wired time code reading gate assembly for determining the speed of said master tape from clock pulses extracted from said timing data from said master tape recorder reading means and for determining the position of said master tape from time code extracted from said timing data from said master tape recorder reading means;
   a hard-wired resolver gate assembly, responsive to both said time code reading gate assemblies, for controlling said slave tape recorder in response to the phase difference between indications derived from said master medium time code and said slave medium time code so that said slave tape matches the precise position and speed of said master tape; and
   processing means for: (a) causing said resolver gate assembly to control said slave tape recorder when the speed of said master tape is in a first predetermined range, the speed difference between said master tape and said slave tape is less than a first predetermined amount, and the distance between the positions of said master tape and said slave tape is less than a second predetermined amount, (b) directly controlling said slave tape recorder so that said slave tape matches the position and speed of said master tape when said resolver gate assembly is not controlling said slave tape recorder and the speed of said master tape is within a second predetermined range, and (c) controlling said slave tape recorder so that said slave tape assumes a position a desired distance behind said master tape when the speed of said master tape is greater than said second predetermined range, said desired distance increasing as said slave tape increases speed to prevent excessive overshoot by said slave tape when said master tape is stopped.

17. Apparatus as in claim 16, wherein said hard-wired resolver gate assembly comprises:
   phase comparator means, responsive to said time code from said slave tape and said master tape, for generating an up-down signal having a first characteristic when an indication derived from said slave tape time code leads an indication derived from said master tape time code and having a second characteristic when said slave tape indication lags said master tape indication;
   means for counting pulses in a direction determined by said first and second characteristics of said up-down signal; and
   means for generating said control signal in response to a counting output of said counting means.

18. Apparatus as in claim 16, wherein said slave tape recorder is an audio tape recorder and said master tape recorder is a video tape recorder.

19. A method of synchronizing a slave device for driving a slave medium with a master device for driving a master medium comprising the steps of:
   monitoring the position of said master medium;
   monitoring the position of said slave medium;
   monitoring the speed of at least one of said slave medium and master medium; and
   controlling said slave device so that said slave medium assumes a position a desired distance behind said master medium position, said desired distance increasing as one of said slave medium and said master medium speed increases to prevent excessive overshoot by said slave medium when said master medium is stopped.

20. A method as in claim 19, wherein said speed monitoring step monitors at least master medium speed and said desired distance is zero when the speed of said master medium is below a predetermined value.

21. A method as in claim 19, wherein said master device and said slave device are tape recorders and said master medium and slave medium are tape.

22. A method of synchronizing a slave device for driving a slave medium with a master device for driving a master medium, said slave device and said master device including reading means for reading timing data from said slave medium and said master medium, respectively, said method comprising the steps of:
   (a) determining the speed of said slave medium from clock pulses extracted from said timing data from said slave device reading means;
   (b) determining the position of said slave medium from time code extracted from said timing data from said slave device reading means;

(c) determining the speed of said master medium from clock pulses extracted from said timing data from said master device reading means;

(d) determining the position of said master medium from time code extracted from said timing data from said master device reading means; and (e) controlling said slave device in response to both said speed and said position of both said slave medium and said master medium so that said slave medium matches both the position and speed of said master medium.

23. A method as in claim 22, wherein said step (e) causes the speed and position of said slave medium and said master medium to be matched below a predetermined speed of said master medium, said step (e) causing said slave medium to assume a position a desired distance behind said master medium position when the speed of said master medium exceeds said predetermined speed, said desired distance increasing as one of said slave medium and said master medium speed increases to prevent excessive overshoot by said slave medium when said master medium is stopped.

24. A method as in claim 22, wherein said step (e) includes the step of controlling said slave device in response to the phase difference between indications derived from said time code read from said master medium and said slave medium.

25. A method as in claim 22, wherein said step (e) further comprises the steps of:

comparing the phase difference between indications derived from said time code read from said master medium and said slave medium and generating an up-down signal having a first characteristic when said indications from said slave medium leads said indications from said master medium and having a second characteristic when said indications from said slave medium lags said indications from said master medium;

counting pulses in a direction determined by said first and second characteristics of said up-down signals; and generating a control signal for controlling said slave device in response to said counting step.

26. A method as in claim 22, wherein said slave device and said master device are tape recorders and said slave medium and said master medium are tape.

27. A method of synchronizing a slave tape on a slave tape recorder with a master tape on a master tape recorder, said slave tape recorder and said master tape recorder including reading means for reading timing data from said slave tape and said master tape, respectively, said method comprising the steps of:

determining the speed of said slave tape from clock pulses extracted from said timing data from said slave tape recorder reading means;

determining the position of said slave tape from time code extracted from said timing data from said slave tape recorder reading means;

determining the speed of said master tape from clock pulses extracted from said timing data from said master tape recorder reading means;

determining the position of said master tape from time code extracted from said timing data from said master tape recorder reading means;

fine controlling said slave tape recorder in response to the phase difference between indications derived from said time codes from said master tape and said slave tape so that said slave tape matches the precise position and speed of said master tape;

causing said fine controlling step to control said slave tape recorder when the speed of said master tape is in a first predetermined range, the speed difference between said master tape and said slave tape is less than a first predetermined amount, and the distance between the positions of said master tape and said slave tape is less than a second predetermined amount;

controlling said slave tape recorder in response to said speed and position of said master tape and said slave tape so that said slave tape matches the position and speed of said master tape when said fine controlling step is not controlling said slave tape recorder and the speed of said master tape is within a second predetermined range; and controlling said slave tape recorder so that said slave tape assumes a position a desired distance behind said master tape when the speed of said master tape is greater than said second predetermined range, said desired distance increasing as one of said slave tape and master tape increases speed to prevent excessive overshoot by said slave tape when said master tape is stopped.

28. A method as in claim 27 wherein said fine controlling step includes the steps of:

generating an up-down signal having a first characteristic when an indication derived from said time code from said slave tape leads an indication derived from said time code from said master tape and having a second characteristic when said indication from said slave tape lags said indication from said master tape;

counting pulses in a direction determined by said first and second characteristics of said up-down signal; and generating a control signal for controlling said slave tape recorder in response to said counting step.

29. A method as in claim 27 wherein said slave tape recorder is an audio tape recorder and said master tape recorder is a video tape recorder.

* * * * *